United States Patent
Shiino et al.

(10) Patent No.: US 9,168,947 B2
(45) Date of Patent: Oct. 27, 2015

(54) POWER STEERING SYSTEM

(75) Inventors: Kohtaro Shiino, Isehara (JP); Makoto Horiuchi, Atsugi (JP)

(73) Assignee: Hitachi Automotive Systems Steering, Ltd., Saitama (JP)

( * ) Notice: Subject to any disclaimer, the term of this patent is extended or adjusted under 35 U.S.C. 154(b) by 329 days.

(21) Appl. No.: 13/616,056

(22) Filed: Sep. 14, 2012

(65) Prior Publication Data
US 2013/0180794 A1  Jul. 18, 2013

(30) Foreign Application Priority Data
Jan. 13, 2012 (JP) .................................. 2012-004569

(51) Int. Cl.
*B62D 5/04* (2006.01)

(52) U.S. Cl.
CPC ................ *B62D 5/04* (2013.01); *B62D 5/0403* (2013.01); *B62D 5/0406* (2013.01); *B62D 5/0409* (2013.01); *B62D 5/0421* (2013.01)

(58) Field of Classification Search
CPC ...... B62D 5/04; B62D 5/0403; B62D 5/0406; B62D 5/0421; B62D 5/0442
USPC ................................................. 180/443, 444
See application file for complete search history.

(56) References Cited

U.S. PATENT DOCUMENTS

| 4,721,175 | A  | * | 1/1988 | Butler .......................... | 180/428 |
| 5,890,394 | A  | * | 4/1999 | Anderson ...................... | 74/422 |
| 6,435,300 | B1 | * | 8/2002 | Stolzenburg et al. ......... | 180/428 |
| 6,598,697 | B2 | * | 7/2003 | Oishi ............................ | 180/428 |
| 6,932,356 | B2 | * | 8/2005 | Gloaguen ..................... | 277/636 |
| 2010/0012419 | A1 | * | 1/2010 | Rombold ...................... | 180/444 |
| 2010/0181139 | A1 | * | 7/2010 | Tokura et al. ................ | 180/444 |

FOREIGN PATENT DOCUMENTS

JP          2006-49618 A       2/2006

* cited by examiner

*Primary Examiner* — Anne Marie Boehler
(74) *Attorney, Agent, or Firm* — Crowell & Moring LLP

(57) ABSTRACT

A power steering system has: a steering shaft; a pinion shaft; a torque sensor; a rack housing communicating with inside of the sensor housing; a rack shaft provided in the rack housing; a motor housing communicating with inside of the rack housing; an electric motor provided in the motor housing; an ECU housing communicating with inside of the motor housing; a motor control unit housed in the ECU housing; and a respiration valve provided at any of the sensor housing, the rack housing and the motor housing and located at an upper side with respect to an upper end of the ECU housing in vehicle-mounted state. The respiration valve has function by which air passes through each house and between inside and outside of the ECU housing so as to absorb change of expansion/contraction of the air in the ECU housing while suppressing entry of water from the outside.

9 Claims, 14 Drawing Sheets

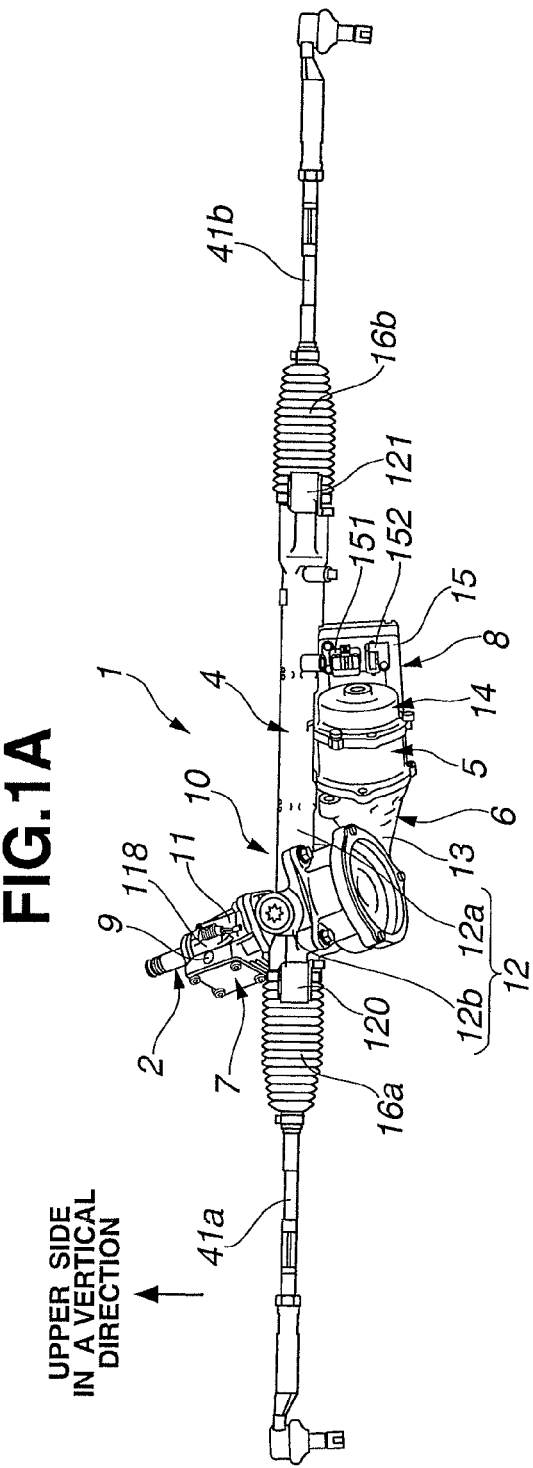
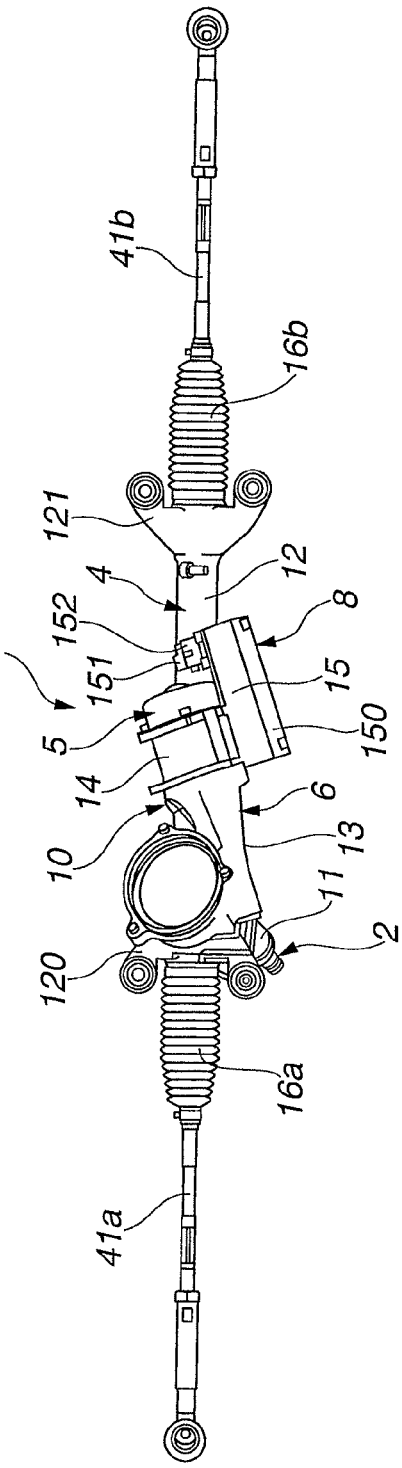

POWER STEERING SYSTEM

BACKGROUND OF THE INVENTION

The present invention relates to a power steering system that provides a steering assist force to steered road wheels of a vehicle.

In recent years, there have been proposed and developed various power steering systems. One such power steering system has, in an ECU housing that houses therein a control unit, a respiratory unit through which the air in the ECU housing can pass so as to absorb change of expansion/contraction of the air in the ECU housing (for instance, Japanese Patent Provisional Publication No. 2006-049618 (hereinafter is referred to as "JP2006-049618")).

SUMMARY OF THE INVENTION

In a case of the power steering system in JP2006-049618, however, if the function of the respiratory unit is inhibited, there is a possibility that reliability of the control unit will decrease.

It is therefore an object of the present invention to provide a power steering system which is capable of improving the reliability of the control unit.

According to one aspect of the present invention, a power steering system mounted in an engine room in a vehicle and providing a steering assist force to steered road wheels, has: a steering shaft to which a turning force from a steering wheel is transmitted; a pinion shaft which is provided at the steering shaft; a torque sensor which is provided at the steering shaft, has a coil in a sensor housing and detects a steering torque generated at the steering shaft; a rack housing whose inside space communicates with an inside space of the sensor housing; a rack shaft which is provided movably in a shaft direction thereof in the rack housing and converts a turning motion of the steering shaft to a shaft direction movement of the steered road wheels by engaging with the pinion shaft; a motor housing whose inside space communicates with the inside space of the rack housing; an electric motor which is provided in the motor housing, has a stator and a rotor and provides the steering assist force to the pinion shaft or the rack shaft through a speed reducer; an ECU housing whose inside space communicates with the inside space of the motor housing; a motor control unit which is housed in the ECU housing and has electronic elements that control drive of the electric motor on the basis of the steering torque; and a respiration valve which is provided at any of the sensor housing, the rack housing and the motor housing and is located at an upper side with respect to an upper end, in a vertical direction, of the ECU housing in a state in which the power steering system is mounted in a vehicle body (in a vehicle-mounted state), the respiration valve having a function by which air can pass through each house and between an inside and an outside of the ECU housing in a bidirectional direction so as to absorb change of expansion/contraction of the air in the ECU housing while suppressing entry of water from the outside.

According to another aspect of the present invention, a power steering system mounted in an engine room in a vehicle and providing a steering assist force to steered road wheels, has: a steering shaft to which a turning force from a steering wheel is transmitted; a pinion shaft which is provided at the steering shaft; a torque sensor which is provided at the steering shaft, has a coil in a sensor housing and detects a steering torque generated at the steering shaft; a rack shaft which converts a turning motion of the steering shaft to a shaft direction movement of the steered road wheels by engaging with the pinion shaft; a rack housing which houses therein the rack shaft movably in a shaft direction of the rack shaft; an electric motor which is provided in a motor housing, has a stator and a rotor and provides the steering assist force to the pinion shaft or the rack shaft through a speed reducer; a motor control unit which is housed in an ECU housing and has electronic elements that control drive of the electric motor on the basis of the steering torque; a tubular member, one end side of which is connected to the ECU housing so as to communicate with an inside of the ECU housing, and the other end side of which is located at an upper side with respect to an upper end, in a vertical direction, of the ECU housing in a vehicle-mounted state; and a respiration valve which is provided at the other end side of the tubular member and by which air in the ECU housing can pass through each house and between the inside and an outside of the ECU housing in a bidirectional direction so as to absorb change of expansion/contraction of the air in the ECU housing while suppressing entry of water into the inside of the ECU housing from the outside.

According to a further aspect of the invention, a power steering system mounted in an engine room in a vehicle and providing a steering assist force to steered road wheels, has: a steering shaft to which a turning force from a steering wheel is transmitted; a pinion shaft which is provided at the steering shaft; a torque sensor which is provided at the steering shaft, has a coil in a sensor housing and detects a steering torque generated at the steering shaft; a rack housing whose inside space communicates with an inside space of the sensor housing; a rack shaft which is provided movably in a shaft direction thereof in the rack housing and converts a turning motion of the steering shaft to a shaft direction movement of the steered road wheels by engaging with the pinion shaft; a motor housing whose inside space communicates with the inside space of the rack housing; an electric motor which is provided in the motor housing, has a stator and a rotor and provides the steering assist force to the pinion shaft or the rack shaft through a speed reducer; an ECU housing whose inside space communicates with the inside space of the motor housing; a motor control unit which is housed in the ECU housing and has electronic elements that control drive of the electric motor on the basis of the steering torque; and a seal member which is provided between a housing unit, which is formed by the sensor housing, the rack housing, the motor housing and the ECU housing so that insides of the sensor housing, the rack housing, the motor housing and the ECU housing communicate with each other, and a partition wall by which the vehicle engine room and a vehicle interior are partitioned and also an inside of the housing unit and the vehicle interior communicate with each other. The seal member suppresses entry of water from an outside into the inside of the housing unit.

The other objects and features of this invention will become understood from the following description with reference to the accompanying drawings.

BRIEF DESCRIPTION OF THE DRAWINGS

FIGS. 1A and 1B are drawings showing a power steering system of an embodiment 1 of the present invention. FIG. 1A is a front view of the power steering system, viewed from a front side of a vehicle. FIG. 1B is a bottom view of the power steering system, viewed from a bottom side of the vehicle.

DETAILED DESCRIPTION OF THE INVENTION

Embodiments of a power steering system of the present invention will be explained below with reference to the drawings.

Embodiment 1

A power steering system 1 (hereinafter, also simply called a system 1) of an embodiment 1 is installed in an engine room of a vehicle, and provides an assist power (a steering assist force) to steered road wheels. The system 1 is an electric motor direct-connected power steering system that generates the steering assist force by the fact that an electric motor directly drives a gear, and this electric motor direct-connected power steering system is a pinion assist type of power steering system in which the electric motor provides the assist power to a rotation of a pinion shaft.

Figure 2:
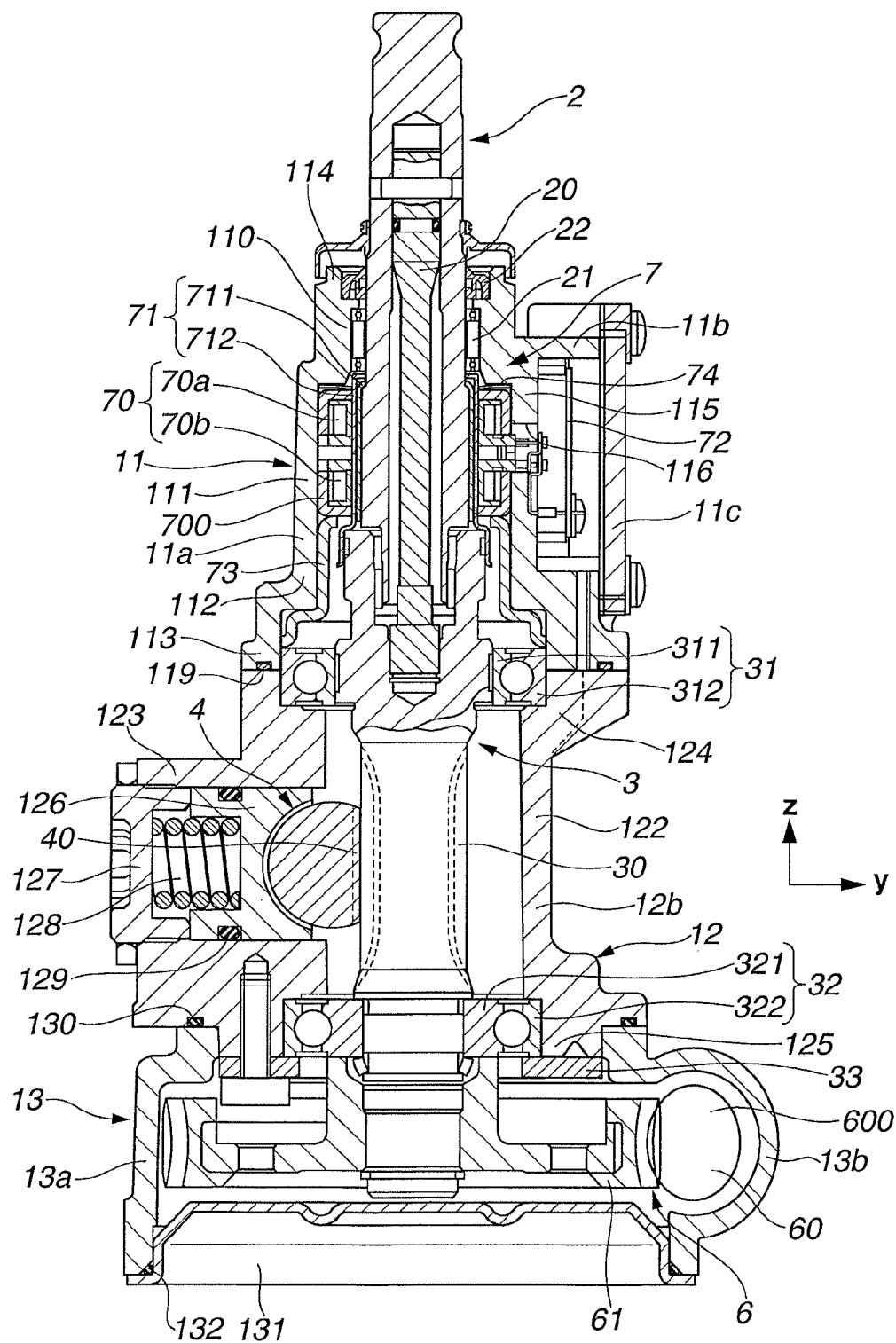
FIG. 2 is a local sectional view of the power steering system, cut in a direction of a steering shaft, of the embodiment 1.
Figure 3:
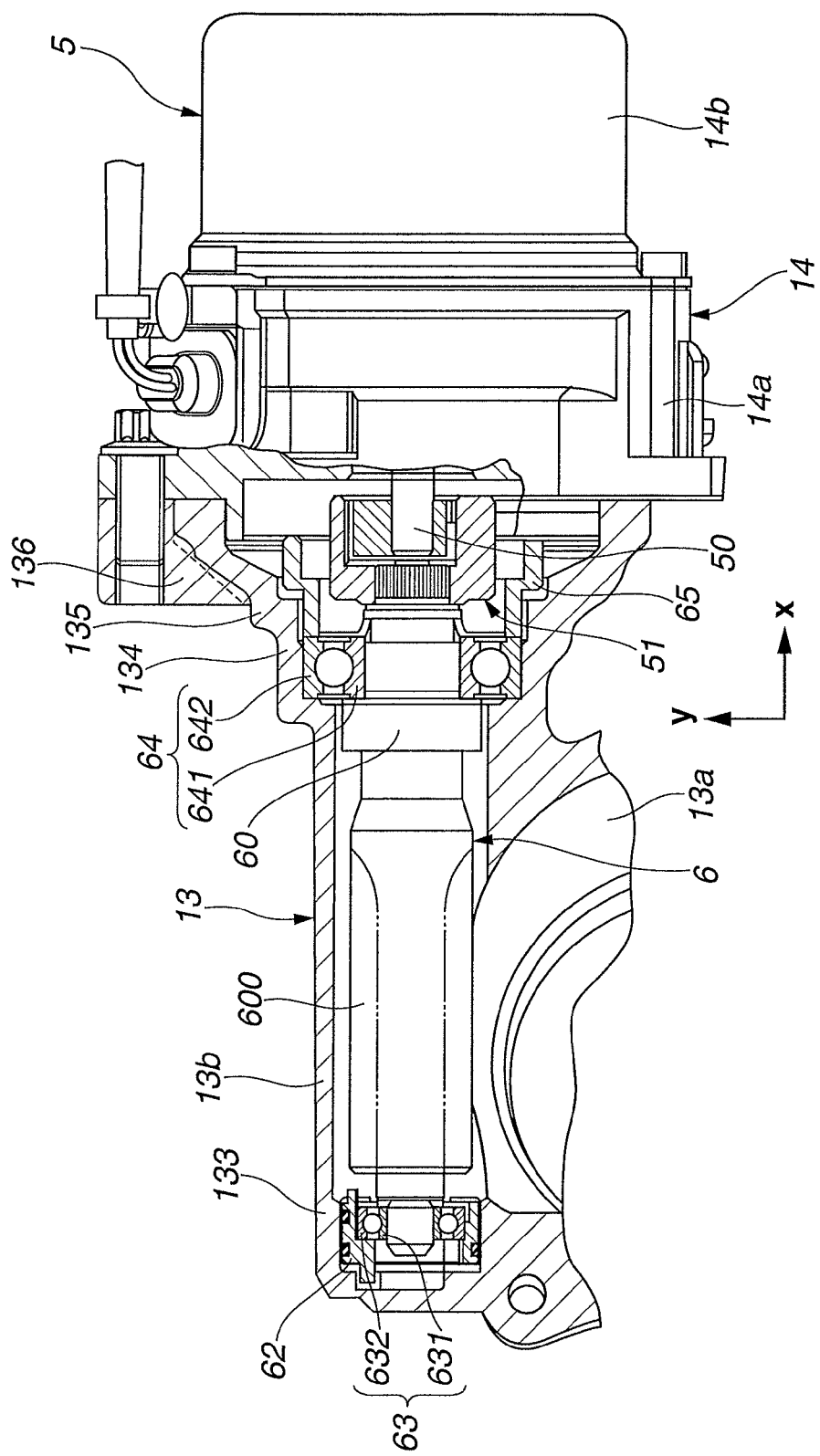
FIG. 3 is a local sectional view of the power steering system, cut in a direction of an output shaft of an electric motor, of the embodiment 1.

FIGS. 1A and 1B show the power steering system 1. FIG. 1A is a front view of the system 1, viewed from a front side of the vehicle. FIG. 1B is a bottom view of the system 1, viewed from a bottom side (from a bottom in a vertical direction) of the vehicle. FIG. 2 is a local sectional view of the system 1, cut in a longitudinal direction along a pinion shaft 3 (cut by a plane passing through the pinion shaft 3). FIG. 3 is a local sectional view of the system 1, cut in a direction of an output shaft 50 of an electric motor 5 (cut by a plane passing through the output shaft 50 of the electric motor 5).

In the following description, for the sake of explanation, a direction in which the output shaft 50 of the electric motor 5 extends and a direction in which a worm shaft 60 of a speed reducer 6 extends are defined as an X-axis. Further, a side of the output shaft 50 with respect to the worm shaft 60 is defined as a positive direction of the X-axis (see FIG. 3). A direction in which the pinion shaft 3 extends is defined as a Z-axis. Further, a side of a steering wheel is defined as a positive direction of the Z-axis (see FIG. 2). A direction which is orthogonal to the X-axis and the Z-axis is a Y-axis. Further, a side of the worm shaft 60 with respect to a worm wheel 61 is defined as a positive direction of the Y-axis (see FIGS. 2 and 3).

The power steering system 1 has a steering shaft 2, the pinion shaft 3, a rack shaft 4, the electric motor 5, the speed reducer 6, a torque sensor 7 and a motor control unit 8. The steering shaft 2 forms a steering operation mechanism of the steering system together with a steering wheel. The steering shaft 2 is housed in a sensor housing 11, and a turning force from the steering wheel is transmitted to the steering shaft 2.

The pinion shaft 3 and the rack shaft 4 form a rack-and-pinion steering gear as a gear mechanism of the steering system. The pinion shaft 3 and the rack shaft 4 are housed in a rack housing 12 (a gear housing part 12b) as a steering gear housing, and convert a turning motion (a rotary motion) of the steering shaft 2 to a shaft direction movement of the steered road wheels. The pinion shaft 3 is provided at the steering shaft 2. The pinion shaft 3 is linked with the steering shaft 2 through a torsion bar 20. The pinion shaft 3 has a pinion gear 30, and a turning force from the steering shaft 2 is transmitted to the pinion shaft 3. The rack shaft 4 is a rack bar that is provided movably in its axial direction (in its shaft direction) in the rack housing 12 (a rack tube 12a). The rack shaft 4 has a rack gear 40 that engages with the pinion gear 30. The steered road wheels are connected to both axial ends of the rack shaft 4 through rack ends 41a, 41b as a link mechanism.

The electric motor 5 is an electrically powered motor that is driven by power supplied from a power source (a battery BATT) that is mounted in the vehicle. The electric motor 5 is housed in a motor housing 14, and provides the steering assist force to the pinion shaft 3 through the speed reducer 6. As the electric motor 5, for instance, a three-phase brushless DC motor can be used. In this case, three phases of the motor are controlled by a switching element or device. The electric motor 5 has a stator and a rotor which are provided in the motor housing 14. The electric motor 5 is provided, at the output shaft 50 thereof, with a rotation angle sensor such as a resolver to detect an rotation angle or a rotational position of the output shaft 50 of the electric motor 5.

The speed reducer 6 is a worm gear mechanism as a speed reduction gear mechanism that decelerates a rotation of the electric motor 5. The speed reducer 6 is housed in a speed reducer housing 13. The speed reducer 6 has the worm shaft 60 and the worm wheel 61. The worm shaft 60 is provided on the output shaft 50 of the electric motor 5, and rotates integrally with the output shaft 50. The worm shaft 60 has a worm 600. The worm wheel 61 engages with the worm 600. The worm wheel 61 is coaxially arranged with the pinion shaft 3, and rotates integrally with the pinion shaft 3. These components are installed so that, by driving the worm shaft 60 by the electric motor 5 and rotating the worm wheel 61 through the worm 600, the assist power can be provided to a rotation of the pinion shaft 3.

The torque sensor 7 detects a rotation state (a rotation amount) of the steering shaft 2. More specifically, the torque sensor 7 detects a relative rotation amount between the steering shaft 2 and the pinion shaft 3 (i.e. a torsion amount of the torsion bar 20) as a steering torque generated at the steering shaft 2 by driver's steering operation, and outputs it to the motor control unit 8.

The motor control unit (a motor control device) 8 is an electronic control unit ECU which is housed in an ECU housing 15 and to which the electric motor 5 and each sensor such as the torque sensor 7 and the rotation angle sensor of the electric motor 5 are connected. The motor control unit 8 (hereinafter, also simply called ECU 8) is provided with electronic components or elements that control the drive of the electric motor 5 on the basis of a detection signal (the steering torque) outputted from the torque sensor 7. For example, the ECU 8 is provided with an inverter circuit (having elements such as a capacitor, a resistor and a coil) that converts DC power supplied from the battery BATT to AC power and supplies it to the electric motor 5, a plurality of semiconductor switches (e.g. FETs) that control current-application to a three-phase coil of the electric motor 5 and a board on which a power relay etc. are mounted.

When the steering wheel is turned by the driver's steering operation, the steering torque inputted to the pinion shaft 3 through the steering shaft 2 is detected by the torque sensor 7. The detected steering torque signal is outputted to the ECU 8. The ECU 8 calculates a target steering assist force on the basis of information such as the inputted steering torque. Further, the ECU 8 outputs a drive signal to the electric motor 5 according to this target steering assist force and signals such as the inputted motor rotational position signal, then controls the electric motor 5. The ECU 8 controls the current that flows in the electric motor 5, thereby providing a proper assist power to the rotation of the pinion shaft 3. Driver's steering effort is then assisted (reduced).

The power steering system 1 is configured with each component housed in a housing unit 10. The housing unit 10 is formed by the sensor housing 11, the rack housing 12, the speed reducer housing 13, the motor housing 14 and the ECU housing 15.

The sensor housing 11 is formed by aluminum based metal material. The sensor housing 11 has, as integral parts, a substantially cylindrical steering shaft housing part 11a that houses therein the steering shaft 2 (the torsion bar 20) and a substantially rectangular solid-shaped board housing part 11b that houses therein a sensor board 72.

The steering shaft housing part 11a has, at an inner peripheral side thereof (inside the steering shaft housing part 11a), a first bearing supporting portion 110, a coil supporting portion 111, a retainer supporting portion 112 and a second bearing supporting portion 113.

The first bearing supporting portion 110 is provided at a Z-axis positive direction end of the steering shaft housing part 11a. A needle bearing 21 as a bearing that rotatably supports the steering shaft 2 is set at and supported by the first bearing supporting portion 110. Here, the steering shaft housing part 11a is provided with a dust seal supporting portion 114 at a Z-axis positive direction side opening of the first bearing supporting portion 110. A dust preventive seal (a dust seal) 22 is set in the dust seal supporting portion 114, and the opening is closed by this dust seal 22.

The coil supporting portion 111 is provided at a Z-axis negative direction side of the first bearing supporting portion 110. The coil supporting portion 111 is formed into a substantially cylindrical shape whose diameter is greater than that of the first bearing supporting portion 110. A sensor coil 70 of the torque sensor 7 is set at and supported by the coil supporting portion 111.

The retainer supporting portion 112 is provided at a Z-axis negative direction side opening of the coil supporting portion 111. The retainer supporting portion 112 is formed into a substantially cylindrical stepped shape. A substantially cylindrical stepped retainer 73 is set at and supported by the retainer supporting portion 112.

The second bearing supporting portion 113 is provided at an inner periphery of a Z-axis negative direction side opening end (a brim portion) of the retainer supporting portion 112. The second bearing supporting portion 113 has a substantially cylindrical shape. A bearing 31 is set at and supported by the second bearing supporting portion 113.

The board housing part 11b is provided at an outer periphery of the steering shaft housing part 11a. The board housing part 11b is formed into a substantially rectangular solid shape that extends substantially parallel to the steering shaft 2. The sensor board 72 of the torque sensor 7 is supported inside the board housing part 11b with the sensor board 72 set parallel to the steering shaft 2. A bottom 115 of the board housing part 11b communicates with the inner peripheral side of the steering shaft housing part 11a through a radial direction hole 116 that penetrates the coil supporting portion 111. A conductor (or a lead) for electrically connecting the sensor coil 70 and the sensor board 72 is set through this radial direction hole 116. An opening of the board housing part 11b is closed by a cover member 11c with bolts. The board housing part 11b is provided, at a side surface thereof, with a penetration hole 117 (see FIG. 4) as a respiration valve setting portion so as to connect an inside and an outside of the board housing part 11b (so that the inside of the board housing part 11b communicates with the outside).

The sensor housing 11 is provided with a connector 118 (see FIG. 1A) for connecting the torque sensor 7 and external electronic equipment.

The torque sensor 7 is a so-called magnetostriction torque sensor. The torque sensor 7 has the sensor coil 70 that generates magnetic flux by current application, a variable magnetic path-resistance member 71 and the sensor board 72, and is connected to the ECU 8. The sensor coil 70 has two coil units 70a, 70b. The sensor coil 70 is set at and supported by the coil supporting portion 111 in the sensor housing 11 so as to surround or encircle an outer periphery of the steering shaft 2.

A pair of the coil units 70a, 70b are integrally held by a cylindrical coil holding member 700. This coil holding member 700 is press-fixed to the coil supporting portion 111. The coil holding member 700 is supported by being sandwiched, in the Z-axis direction, between a disc spring 74 provided at a Z-axis positive direction end portion of the coil supporting portion 111 and the retainer 73.

The steering shaft 2 is formed by magnetic material, and forms magnetic field by the magnetic flux generated by the sensor coil 70.

The variable magnetic path-resistance member 71 has an inner ring 711 and an outer ring 712 which are formed by conductive and non-magnetic material such as aluminum. Each of the inner ring 711 and the outer ring 712 is a cylindrical member having a plurality of windows (opening portions) that are provided in the Z-axis direction. The inner ring 711 is secured to and retained by the outer periphery of the steering shaft 2, and rotates integrally with the steering shaft 2. The outer ring 712 is secured to and retained by a Z-axis positive direction end of the pinion shaft 3, and rotates integrally with the pinion shaft 3. The outer ring 712 is disposed and supported between the steering shaft 2 and the sensor coil 70 so that an outer peripheral surface of the outer ring 712 faces to an inner peripheral surface of the sensor coil 70, and an inner peripheral surface of the outer ring 712 faces to an outer peripheral surface of the inner ring 711.

An overlap area of the windows between the inner and outer rings 711, 712 changes according to a change of the relative rotation amount between the steering shaft 2 and the pinion shaft 3, and thus magnetic path resistance of the magnetic field generated by the sensor coil 70 varies. The sensor board 72 is provided with a circuit that calculates the steering torque in accordance with an impedance change of the sensor coil 70. Here, the sensor 7 is not limited to the torque sensor as long as the sensor detects the rotation state (the rotation amount) of the steering shaft 2. The sensor could be a steering angle sensor. That is, the power steering system 1 could determine an amount of the steering assist using a detected steering angle.

The rack housing 12 is formed by aluminum based metal material. The rack housing 12 has, as integral parts, the long narrow tubular rack tube 12a for housing therein the rack shaft 4 and the gear housing part 12b that is a gear box for housing therein the rack-and-pinion gear. Mount brackets 120, 121, where rubber bushings for fixing the rack housing 12 to a vehicle body side are provided, are formed at both ends of the rack tube 12a. A rack end bushing is provided inside the rack tube 12a.

As shown in FIG. 2, the gear housing part 12b has a hollow cylindrical pinion shaft housing portion 122 that rotatably houses therein the pinion shaft 3 through two bearings 31, 32 and a hollow cylindrical rack guide housing portion 123 that houses therein a rack guide 126. The bearings 31, 32 are ball bearings, and have inner and outer rings 311, 312 and inner and outer rings 321, 322 respectively.

A Z-axis positive direction side opening end of the pinion shaft housing portion 122 is joined to a Z-axis negative direction side opening end of the sensor housing 11 (the second bearing supporting portion 113) through a seal member 119, and fixed together with a bolt(s). The pinion shaft housing portion 122 is provided, at the Z-axis positive direction side opening end thereof, with a first bearing supporting portion 124, also is provided, at a Z-axis negative direction side opening end thereof, with a second bearing supporting portion 125. The bearing 31 is set at and supported by the first bearing supporting portion 124. More specifically, the bearing 31 is supported at inner circumferences of the first bearing supporting portion 124 and the second bearing supporting portion 113 of the sensor housing 11 with the outer ring 312 of the bearing 31 sandwiched, in the Z-axis direction, between a Z-axis negative direction edge of the first bearing supporting portion 124 and a Z-axis negative direction edge of the retainer 73. The bearing 32 is set at and supported by the second bearing supporting portion 125. More specifically, the bearing 32 is supported with the outer ring 322 of the bearing 32 sandwiched, in the Z-axis direction, between a Z-axis positive direction edge of the second bearing supporting portion 125 and a substantially ring-shaped retainer 33. The retainer 33 is joined and fixed to a Z-axis negative direction end of the second bearing supporting portion 125 with bolts.

An opening of the rack guide housing portion 123, which opens toward the outside, is closed by a lid or cover member 127 by screwing. A spring 128 is held at the lid member 127. The rack guide 126 is slidably installed in the rack guide housing portion 123, and is forced toward the pinion shaft housing portion 122 by the spring 128. The rack guide 126 functions to properly engage tooth surfaces of the rack shaft 4 with pinion gear 30 by pressing the rack shaft 4 toward the pinion shaft housing portion 122 (by pressing the rack shaft 4 against the pinion gear 30) from a back side of the rack shaft 4. A gap between the rack guide 126 and the rack guide housing portion 123 is sealed by a seal member 129 that is provided at an outer periphery of the rack guide 126. The rack shaft 4 is supported not only by the pinion shaft 3 and the rack guide 126, but the rack shaft 4 is supported movably in the shaft direction by the rack end bushing(s) in the rack tube 12a.

The speed reducer housing 13 has, as integral parts, a substantially cylindrical shallow worm wheel housing part 13a and a substantially cylindrical worm shaft housing part 13b. Both insides of the worm wheel housing part 13a and the worm shaft housing part 13b communicate with each other. The worm wheel housing part 13a houses therein the worm wheel 61 fixed to a Z-axis negative direction end of the pinion shaft 3. A Z-axis positive direction side opening end of the worm wheel housing part 13a is joined to the Z-axis negative direction side opening end of the rack housing 12 (the pinion shaft housing portion 122) through a seal member 130, and fixed together with a bolt(s). A cover member 131 is fitted to a Z-axis negative direction side opening end of the worm wheel housing part 13a through a seal member 132, and joined together with a bolt(s).

As shown in FIG. 3, the worm shaft housing part 13b rotatably houses therein the worm shaft 60 through two bearings 63, 64. The bearings 63, 64 are ball bearings, and have inner and outer rings 631, 632 and inner and outer rings 641, 642 respectively. The worm shaft housing part 13b has, at an inner peripheral side thereof (inside the worm shaft housing part 13b), a first bearing supporting portion 133 at an X-axis negative direction end and a second bearing supporting portion 134, a retainer supporting portion 135 and a connecting portion 136 at an X-axis positive direction end. The bearing 63 is set at and supported by the first bearing supporting portion 133 through a retainer 62. The bearing 64 is set at and supported by the second bearing supporting portion 134.

The retainer supporting portion 135 is provided at an X-axis positive direction side of the second bearing supporting portion 134. The retainer supporting portion 135 is formed into a substantially cylindrical stepped shape. A substantially cylindrical stepped retainer 65 is set at and supported by the retainer supporting portion 135. The bearing 64 is supported with an outer ring 642 of the bearing 64 sandwiched, in the X-axis direction, between an X-axis negative direction edge of the second bearing supporting portion 134 and an X-axis negative direction edge of the retainer 65.

The connecting portion 136 is provided at an X-axis positive direction side of the retainer supporting portion 135. The connecting portion 136 is joined to an X-axis negative direction side opening end of the motor housing 14 (a motor housing body 14a), and fixed together with a bolt(s).

The motor housing 14 is formed by fixing a bottomed cylindrical motor cover 14b to the substantially cylindrical motor housing body 14a with a bolt(s). The stator of the electric motor 5 is secured to an inner circumferential side of the motor housing 14. The rotor of the electric motor 5, which rotates integrally with the output shaft 50, is set at an inner circumferential side of the stator. The output shaft 50 is rotatably set through a bearing in the motor housing 14. An X-axis negative direction end of the output shaft 50 is fixed to an X-axis positive direction end of the worm shaft 60 through a connecting member 51.

The motor housing 14 forms a gear unit housing by the fact that the motor housing 14 is fixed to the speed reducer housing 13 (the worm shaft housing part 13b). A gear unit (the electric motor 5 and the speed reducer 6) as an actuator is housed in this gear unit housing.

The ECU housing 15 houses therein the ECU 8 as the control device means. The ECU housing 15 is formed integrally with the motor housing 14. That is, the electric motor 5 (and the rotation angle sensor) and the ECU 8 are housed in the same housing, and a motor unit and an ECU unit are configured as an electrical mechanical integrated motor ECU unit.

As shown in FIGS. 1A and 1B, the ECU housing 15 has a substantially rectangular solid shape that extends substantially parallel to the output shaft 50 of the electric motor 5, and is formed at an outer periphery of the motor housing 14. A control board of the ECU 8 is supported inside the ECU housing 15 with the control board set parallel to the output shaft 50. Here, an arrangement (a position) of the ECU housing 15 with respect to the motor housing 14 is not limited to that of the present embodiment. For instance, the control board could be set substantially perpendicularly to the output shaft 50.

An inside of the ECU housing 15 communicates with the inner circumferential side of the motor housing 14 (the motor housing body 14a) through a communication hole. A conductor (or a lead) for electrically connecting the control board of the ECU 8 and the stator (coil) of the electric motor 5 and a conductor (or a lead) for electrically connecting the control board of the ECU 8 and the rotation angle sensor of the electric motor 5 are set through this communication hole.

An opening of the ECU housing 15 is closed by a cover member 150. The ECU housing 15 is provided with connectors 151, 152 for connecting the ECU 8 and external electronic equipment. The connector 151 is a power connector, and is connected to the battery BATT through a harness (a power cable). The ECU 8 is supplied with the power from the battery BATT, and supplies a drive power to the electric motor 5 through the conductor set in the communication hole in the ECU housing 15. The connector 152 is a signal connector. The connector 152 is connected to equipment provided in a vehicle interior through a two-way communication-capable CAN communication line, also is connected to the sensor housing 11 (the connector 118) through a signal line.

The housings 11 to 15 which form the housing unit 10 are combined so that their insides (inside spaces) communicate with each other. That is, the sensor housing 11 is provided so that its inside space and the inside space of the rack housing 12 communicate with each other. As shown in FIG. 2, an inside space of the board housing part 11b of the sensor housing 11 communicates with the inside of the steering shaft housing part 11a at the outer peripheral side of the steering shaft 2 through the radial direction hole 116. The space at the outer peripheral side of the steering shaft 2 communicates with the inside space of the rack housing 12 (the gear housing part 12b) through an inner circumferential side of the retainer 73 and the bearing 31 (a gap between the inner ring 311 and the outer ring 312).

The rack housing 12 is provided so that its inside space and the inside space of the motor housing 14 communicate with each other. The space in the pinion shaft housing portion 122 communicates with the inside space of the speed reducer housing 13 (the worm wheel housing part 13a) through the bearing 32 (a gap between the inner ring 321 and the outer ring 322) and an inner circumferential side of the retainer 33.

As shown in FIG. 3, the inside space of the speed reducer housing 13 (the worm shaft housing part 13b) communicates with the inside space of the motor housing 14 (the motor housing body 14a) through the bearing 64 (a gap between the inner ring 641 and the outer ring 642) and an inner circumferential side of the retainer 65.

The motor housing 14 is provided so that its inside space and the inside space of the ECU housing 15 communicate with each other through the communication hole.

In this manner, the ECU housing 15 is provided so that its inside space communicates with the inside space of the sensor housing 11 through the motor housing 14, the speed reducer housing 13 and the rack housing 12.

As shown in FIG. 1A, in a state (in a vehicle-mounted state) in which the power steering system 1 is mounted in the vehicle body, the sensor housing 11 is located at an upper side in the vertical direction with respect to the rack housing 12. The rack housing 12 is located at an upper side in the vertical direction with respect to the speed reducer housing 13, the motor housing 14 and the ECU housing 15. That is, the sensor housing 11 is positioned at the upper side in the vertical direction with respect to the other housings 12 to 15 in the vehicle-mounted state. Here, the housing unit 10 is provided with a respiratory structure (a respiratory unit). The respiratory unit is the one that has a so-called internal pressure control function by which the air in the housing unit 10 can pass through each house and between the inside and the outside of the housing unit 10 in a bidirectional direction so as to absorb change of expansion/contraction of the air in the housing unit 10 while suppressing infiltration (or entry) of water into the inside of the housing unit 10 from the outside. More specifically, the respiratory unit is a respiration valve 9 having a breathing film. The respiration valve 9 is provided at the sensor housing 11 of the housing unit 10. As shown in FIG. 1A, in the vehicle-mounted state, the respiration valve 9 is located at an upper side with respect to an upper end, in the vertical direction, of the ECU housing 15.

Figure 4:
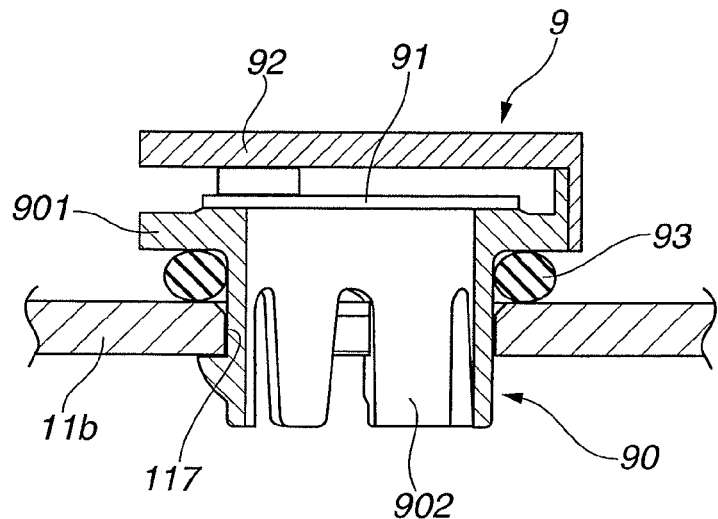
FIG. 4 is a sectional view of a respiration valve, cut in an axial direction, of the embodiment 1.

FIG. 4 is a sectional view of the respiration valve 9, cut in its axial direction. The respiration valve 9 is set in the penetration hole 117 formed at the board housing part 11b of the sensor housing 11 so as to penetrate a side wall of the board housing part 11b. The respiration valve 9 has a respiration hole forming member 90 made of, for instance, resin material and a filter 91 that is the breathing film.

The respiration hole forming member 90 is formed into a substantially cylindrical shape. The respiration hole forming member 90 has a brim portion 901 at an axial direction one end of the respiration hole forming member 90 and a snap-fit type stopper portion 902 at the other end. The filter 91 is set on an opening at a brim portion 901 side of the respiration hole forming member 90 so as to closely or tightly (or firmly) cover the opening. The filter 91 is a water repellent film which is permeable to gas such as the air, but impervious to liquid such as the water. For example, as the filter 91, a porous film such as PTFE can be used. The respiration valve 9 also has a canopy or shade 92 that is formed integrally with or fixedly to the respiration hole forming member 90 and covers the filter 91 with a certain axial direction distance provided between the filter 91 and the shade 92.

When the respiration hole forming member 90 is inserted into the penetration hole 117 of the board housing part 11b, an inner circumferential side of the respiration hole forming member 90 forms a passage or an air vent as a respiration hole, and the stopper portion 902 is fitted in and fixed to the board housing part 11b (the penetration hole 117). Here, a seal member (an O-ring) 93 is provided between the board housing part 11b and the brim portion 901. And upon the insertion and fixing of the respiration valve 9, the seal member 93 is pressed and elastically deformed in the axial direction between the board housing part 11b and the brim portion 901, and a gap between the penetration hole 117 and the respiration hole forming member 90 is sealed. Ventilation (air pass) of the sensor housing 11 between the inside and the outside of the sensor housing 11 is therefore performed only through the respiration hole (the air vent) and a breathing surface of the filter 91.

The shade 92 covers the filter 91 with the certain axial direction distance provided between them, thereby preventing the filter 91 from being directly splashed with water even in such circumstances that a high-pressure water flow hits on the sensor housing 11 and suppressing damage to the filter 91.

Function of Embodiment 1

Next, a function of the power steering system 1 will be explained. The electrical control unit ECU having the electronic components or elements is generally housed in a casing (the ECU housing), and generates heat by the current-application. In a case where the ECU is mounted in the engine room, there is a risk that the ECU will be splashed with the water or will be submerged by the water, and great variation (big change) in the heat around the ECU and the ECU housing occurs, as compared with a case where the ECU is set in the vehicle interior. That is, besides generating the heat by the heat generation components or elements of the ECU, the ECU (or the ECU housing) receives heat from an engine and is cooled off by rain or car wash, then temperature in the ECU housing tends to considerably change. For this reason, in a related art, the ECU housing having a waterproofing structure using a seal member etc. has been proposed and developed, and the respiratory structure (or the respiratory unit) for avoiding effect by thermal expansion and thermal contraction of the air in the ECU housing is provided at the ECU housing. In such related art, while a pressure difference between the inside and the outside of the ECU housing is cancelled by allowing ventilation (air pass), infiltration of liquid such as the water into the ECU housing is suppressed.

However, in the case where such respiratory unit is provided at the ECU housing, the following problems arise. That is, if the ECU housing is completely submerged by the water, since the respiratory unit is also submerged by the water, its internal pressure control function is inhibited. Further, in this submerged state, for example, when the ECU housing is cooled off by the water, the air in the ECU housing contracts and a great negative pressure is produced. Thus, a load exerted on the ECU housing and the respiratory unit (the seal member) becomes great. In addition, there is a risk that the water (moisture) will infiltrate into the inside of the ECU housing through a harness connecting the battery BATT and the ECU from an end, at the battery BATT side, of the harness. Therefore there is a possibility that reliability of the ECU will decrease.

In contrast to this, in the embodiment 1, the respiration valve 9 is located at the upper side with respect to the upper end, in the vertical direction, of the ECU housing 15. Thus, it is possible to decrease the risk that both of the ECU housing 15 and the respiration valve 9 are submerged by the water. That is, even when the ECU housing 15 is completely submerged by the water (a surface of the water reaches up to a level of the upper end, in the vertical direction, of the ECU housing 15), there is a possibility that only the respiration valve 9 will not be submerged by the water (namely that the respiration valve 9 will not suffer damage by the water). If the breathing surface of the filter 91 of the respiration valve 9 is not completely covered or filled with the water, the flow of the air into the inside of the housing unit 10 is possible. As described above, the housings 11 to 15 forming the housing unit 10 of the system 1 are combined so that their insides (inside spaces) communicate with each other. Thus, when the air in the ECU housing 15 expands/contracts, by the fact that the air passes through the respiration valve 9 that is provided at the housing (i.e. the sensor housing 11) except the ECU housing 15, the change of expansion/contraction of the air in the ECU housing 15 is absorbed. Consequently, it is possible to suppress increase of the load exerted on the ECU housing 15 and the respiratory unit (the seal member), and to suppress the infiltration of the water (the moisture) from the battery BATT side. The reliability of the ECU 8 can be therefore improved.

The respiration valve 9 of the embodiment 1 has, as the integral portions, a cylindrical portion that forms the respiration hole, a portion (the brim portion 901) where the filter 91 is set, a portion (the brim portion 901) that presses the seal member 93 and a portion (the stopper portion 902) that is fitted in and fixed to the sensor housing 11 (the penetration hole 117), which are formed integrally with or fixedly to the respiration hole forming member 90. This therefore reduces parts count of the respiration valve 9, and also reliability of connection (fixing) of the respiration valve 9 to the sensor housing 11 and workability of installation of the respiration valve 9 can be improved. Here, the structure of the respiration valve 9 is not limited to that shown in FIG. 4 as long as the respiration valve can suppress the infiltration of the water and allows the ventilation (the air pass) in the bidirectional direction. For instance, the filter 91 could be set so as to directly cover the penetration hole 117.

In the embodiment 1, as the gear mechanism, the rack-and-pinion mechanism is employed. However, the gear mechanism is not limited to the rack-and-pinion mechanism, but could be a ball-and-nut type steering gear. Further, in the embodiment 1, the present invention is applied to the pinion assist type power steering system. However, the present invention can be applied to a rack assist type power steering system in which the electric motor provides the assist power to the rack shaft through the speed reducer such as the ball-and-nut mechanism. Furthermore, the embodiment 1 is the electric motor direct-connected power steering system. However, it could be a so-called electro-hydraulic power steering system that generates power of pressure as the steering assist force by driving an oil pump by the electric motor.

In addition, layout or arrangement of the housings 11 to 15 forming the housing unit 10 is not limited to that in the embodiment 1. In the embodiment 1, although the sensor housing 11 and the rack housing 12 are fixedly joined together, both the housings 11, 12 could be separately provided. For instance, the housings 11, 12 could communicate with each other through a tubular member (e.g. a covering or sheathing member of a signal wire). Also, the sensor housing 11 and the motor housing 14 (the speed reducer housing 13) could be integrally joined together, and the speed reducer 6 and the torque sensor 7 could be housed in the same housing.

Further, the housing unit 10 could be formed with a part of the housings 11 to 15, e.g. the sensor housing 11, removed from the housings 11 to 15. That is, the respiration valve 9 can be provided at any of the housings 11 to 14 as long as each of the housings 11 to 14 is located at the upper side with respect to the upper end, in the vertical direction, of the ECU housing 15 in the vehicle-mounted state and each inside of the housings 11 to 14 communicates with the inside of the ECU housing 15. In the embodiment 1, since the respiration valve 9 is provided at the sensor housing 11 that is generally located at the uppermost side in the vertical direction among the housings 11 to 14, the risk of the submersion of the respiration valve 9 can be further decreased. Here, in a case of a layout in which the housing except the sensor housing 11 among the housings 11 to 14 is located at the uppermost side in the vertical direction, the respiration valve 9 is provided at this uppermost-located housing, then the same effect can be gained.

In the embodiment 1, since the respiration valve 9 is provided at the higher position than the ECU housing 15, for example, even in a case where the ECU housing 15 (the motor ECU unit) is provided at a lower side in the vertical direction with respect to the rack housing 12, the risk of the submersion of the respiration valve 9 can be decreased. Degree of freedom (flexibility) in the layout of the system 1 (the ECU 8 and the motor ECU unit) can be therefore enhanced.

Effects of Embodiment 1

From the foregoing, the embodiment 1 includes the following structure or configuration of the power steering system, and has the following effects.

(1) The power steering system mounted in the engine room in the vehicle and providing the steering assist force to the steered road wheels, has: the steering shaft 2 to which the turning force from the steering wheel is transmitted; the pinion shaft 3 provided at the steering shaft 2; the torque sensor 7 provided at the steering shaft 2 and having a coil (sensor coil) 70 in the sensor housing 11 to detect the steering torque generated at the steering shaft 2; the rack housing 12 whose inside space communicates with the inside space of the sensor housing 11; the rack shaft 4 provided movably in the shaft direction thereof in the rack housing 12 and converting the turning motion of the steering shaft 2 to the shaft direction movement of the steered road wheels by engaging with the pinion shaft 3; the motor housing 14 whose inside space communicates with the inside space of the rack housing 12; the electric motor 5 provided in the motor housing 14 and having the stator and the rotor to provide the steering assist force to the pinion shaft 3 or the rack shaft 4 through the speed reducer 6; the ECU housing 15 whose inside space communicates with the inside space of the motor housing 14; the motor control unit (ECU) 8 housed in the ECU housing 15 and having electronic elements that control drive of the electric motor 5 on the basis of the detected steering torque; and the respiration valve 9 provided at any of the sensor housing 11, the rack housing 12 and the motor housing 14 (including the speed reducer housing 13) (so as to communicate with that housing). The respiration valve 9 is located at the upper side with respect to the upper end, in the vertical direction, of the ECU housing 15 in the vehicle-mounted state. The respiration valve 9 has the function by which the air can pass through each house and between the inside and the outside of the ECU housing 15 in the bidirectional direction so as to absorb change of expansion/contraction of the air in the ECU housing 15 while suppressing entry of the water from the outside.

Thus, it is possible to decrease the risk that both of the ECU housing 15 and the respiration valve 9 are submerged by the water, and the reliability of the ECU 8 can be therefore improved.

(2) The sensor housing 11 is located at the upper side in the vertical direction with respect to the rack housing 12, the motor housing 14 and the ECU housing 15, and the respiration valve 9 is provided at the sensor housing 11.

Therefore, the risk of the submersion of the respiration valve 9 can be further decreased, and the reliability of the ECU 8 can be therefore improved.

Embodiment 2

Figure 5:
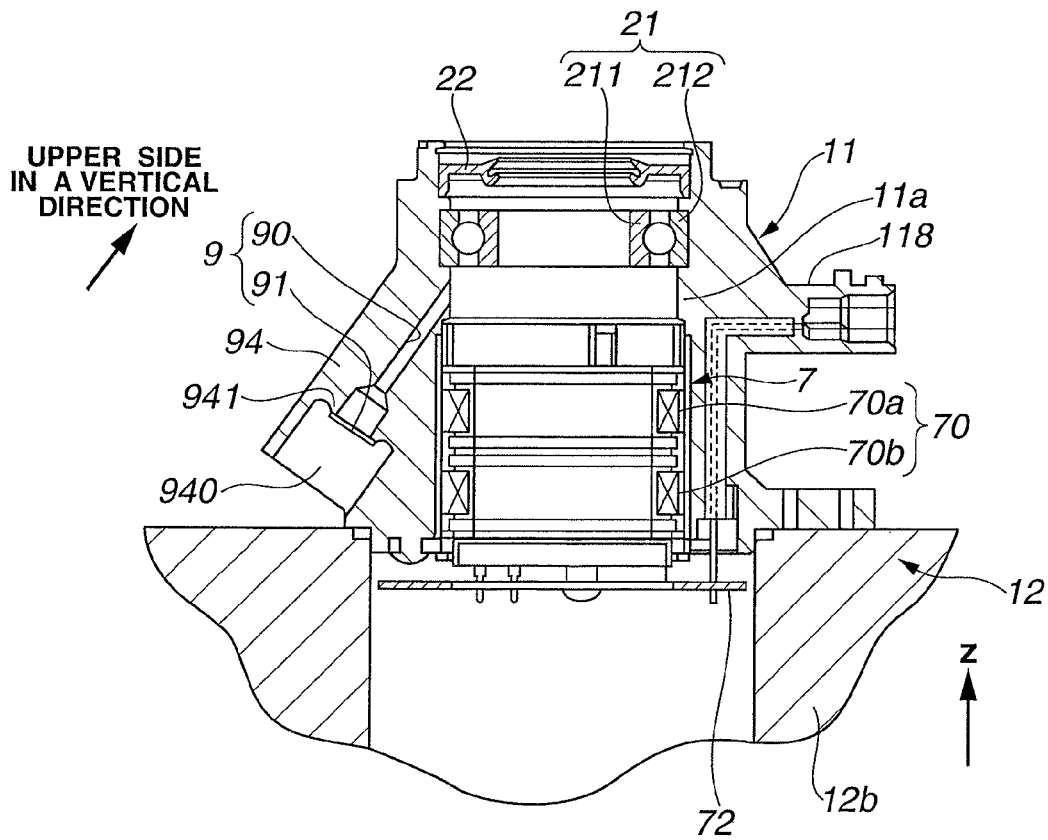
FIG. 5 is a sectional view of a sensor housing, cut in the axial direction, of an embodiment 2.

In a power steering system 1 of an embodiment 2, the sensor housing 11 is formed by resin material by molding (using a mold), and the respiration valve 9 is formed integrally with the sensor housing 11 by molding. FIG. 5 is a sectional view of the sensor housing 11, cut in the axial direction, of the embodiment 2. In the following description, the same components or elements as the embodiment 1 are denoted by the same reference numbers, and an explanation of these components is omitted.

The sensor housing 11 is formed by the resin material by the molding. The sensor housing 11 has only the steering shaft housing part 11a, and has no board housing part 11b. The sensor board 72 has a substantially ring-shape, and is set and supported in the gear housing part 12b of the rack housing 12 with the sensor board 72 spaced a slight distance in the Z-axis direction from a Z-axis negative direction end surface of the steering shaft housing part 11a. The sensor board 72 is coaxially arranged with the steering shaft 2 so as to be set or extend substantially perpendicularly to the steering shaft 2, and the steering shaft 2 penetrates an inner circumference of the ring-shaped sensor board 72. The sensor coil 70 and the sensor board 72 are electrically connected by a terminal that extends in the Z-axis direction. A space for a conductor (or a lead) for electrically connecting the sensor board 72 and the connector 118 is formed integrally with the sensor housing 11 by the molding. The connector 118 is formed integrally with the sensor housing 11 by the molding.

The sensor housing 11 is provided with a respiration valve housing portion 94. The respiration valve housing portion 94 is formed integrally with the sensor housing 11 by the molding so as to protrude from an outer periphery of the steering shaft housing part 11a.

An opening portion 940 that is a recessed portion and opens toward a lower side in the vertical direction is formed at the respiration valve housing portion 94. The respiration valve housing portion 94 and the opening portion 940 are provided so that a lower end, in the vertical direction, of the opening portion 940 is set substantially horizontally in the vehicle-mounted state. The respiration valve housing portion 94 is provided, at an inside thereof, with a substantially linear respiration hole 90 that penetrates the inside of the respiration valve housing portion 94 so that an inner peripheral side of the opening portion 940 and an inner peripheral side of the steering shaft housing part 11a communicate with each other.

A filter setting portion 941 is formed at an opening part of the respiration hole 90 at the inner peripheral side of the opening portion 940 (at an upper bottom at an upper side, in the vertical direction, of the opening portion 940). A diameter of the respiration hole 90 at the filter setting portion 941 is set to be greater than that at the other portion. The filter 91 is set at the opening part of the respiration hole 90 so as to closely or tightly (or firmly) cover and close the opening of the respiration hole 90 which opens to the opening portion 940. The respiration hole 90 and the filter 91 are set so that the respiration hole 90 extends in the substantially vertical direction and the filter 91 extends in the substantially horizontal direction in the vehicle-mounted state.

The respiration valve 9 has the respiration hole 90 and the filter 91. The respiration valve 9 is provided at an upper side in the vertical direction with respect to the opening portion 940 in the respiration valve housing portion 94. The other configuration or structure is the same as the embodiment 1, its explanation is thus omitted here.

Next, a function of the power steering system 1 will be explained. In the embodiment 2, since the sensor housing 11 is formed by the resin material by molding, it is possible to easily set the respiration valve 9. That is, since a shape of the portion where the respiration valve 9 (the filter 91) is set can be easily formed at the sensor housing 11 by the molding (e.g. by insert-molding), this facilitates the setting of the respiration valve 9 (the filter 91). Workability of installation of the respiration valve 9 can therefore be improved. Here, the respiration valve 9 (the respiration hole 90) could not be formed integrally with the sensor housing 11 by the molding.

In the embodiment 2, the respiration valve 9 (the respiration hole 90) is formed integrally with the sensor housing 11 by the molding. Thus, there is no need to separately form the respiration valve 9 (the respiration hole forming member) and to join this respiration valve 9 to the sensor housing 11. This facilitates the setting of the respiration valve 9. For instance, when a basic structure (such as the respiration hole 90 and the filter setting portion 941) of the respiration valve 9 is formed integrally with the sensor housing 11 by the molding, installation of the respiration valve 9 is completed only by setting the filter 91. Here, when setting the filter 91, for instance, the filter 91 is set on the opening part of the respiration hole 90, and its circumference could be welded by thermal welding, or firmly set using an adhesive.

Further, in the case where the respiration valve 9 and the sensor housing 11 are formed as the separate components, it is required to provide the seal member as the waterproofing structure to the joining portion of the respiration valve 9. However, in the case where the respiration valve 9 and the sensor housing 11 are formed integrally with each other by the molding, like the embodiment 2, this does not require any waterproofing structure (the seal member etc.). It is therefore possible to reduce parts count, and to improve a sealing performance.

The respiration valve 9 (the filter 91) is provided in the respiration valve housing portion 94, and the opening portion 940 through which the respiration valve 9 (the filter 91) breathes opens toward the lower side in the vertical direction. It is therefore possible to suppress adhesion of the water to the respiration valve 9 (the filter 91) by the splash of the water from the upper side in the vertical direction (e.g. upon the car wash). Here, even if the opening portion 940 is not provided, such adhesion of the water can be suppressed to some extent as long as the filter 91 is set substantially horizontally so as to face to the lower side in the vertical direction.

In the embodiment 2, since the opening portion 940 enclosing or surrounding the circumference of the filter 91 is provided at the lower side in the vertical direction with respect to the filter 91, such circumstances that the filter 91 is splashed with the water can be effectively suppressed. For instance, even in a case where a high-pressure water flow hits on the housing unit 10 from a lateral (transverse) direction, the filter 91 can be prevented from being directly splashed with the water. Further, even if the sensor housing 11 is submerged by the water and the surface of the water reaches up to the upper side in the vertical direction with respect to the opening portion 940 of the respiration valve housing portion 94, since the air remains inside the opening portion 940, the air pass (breathing or ventilation) through the filter 91 is possible by at least this remaining air. That is, the air pass (breathing or ventilation) through the filter 91 is possible until the water level in the opening portion 940 rises (by the breathing) and the filter 91 is covered by the water. It is thus possible to increase the function of the respiration valve 9, and the reliability of the ECU 8 can be improved.

Here, in the embodiment 2, the opening portion 940 and the filter 91 are provided so that the lower end, in the vertical direction, of the opening portion 940 and the filter 91 are set substantially horizontally in the vehicle-mounted state. However, even when these opening portion 940 and filter 91 slightly incline with respect to a horizontal plane, a measure of function/effect can be gained. Furthermore, in order to increase the function/effect, it is preferable to set a size (a length) in the vertical direction of the opening portion 940 to be large.

Effects of Embodiment 2

From the foregoing, the embodiment 2 includes the following structure or configuration of the power steering system, and has the following effects in addition to the effects (1) and (2) of the embodiment 1.

(1) The sensor housing 11 is formed by the resin material by the molding.
This thus facilitates the setting of the respiration valve 9.

(2) The sensor housing 11 is provided with the respiration valve housing portion 94 having the opening portion 940 that opens toward the lower side in the vertical direction, and the respiration valve 9 is provided at the upper side in the vertical direction with respect to the opening portion 940 in the respiration valve housing portion 94.
It is therefore possible to suppress the adhesion of the water to the respiration valve 9, and to increase the function of the respiration valve 9.

(3) The respiration valve 9 is formed integrally with the sensor housing 11 by the molding.
This thus reduces the parts count then further facilitates the setting of the respiration valve 9 while improving the sealing performance.

Embodiment 3

Figure 6:
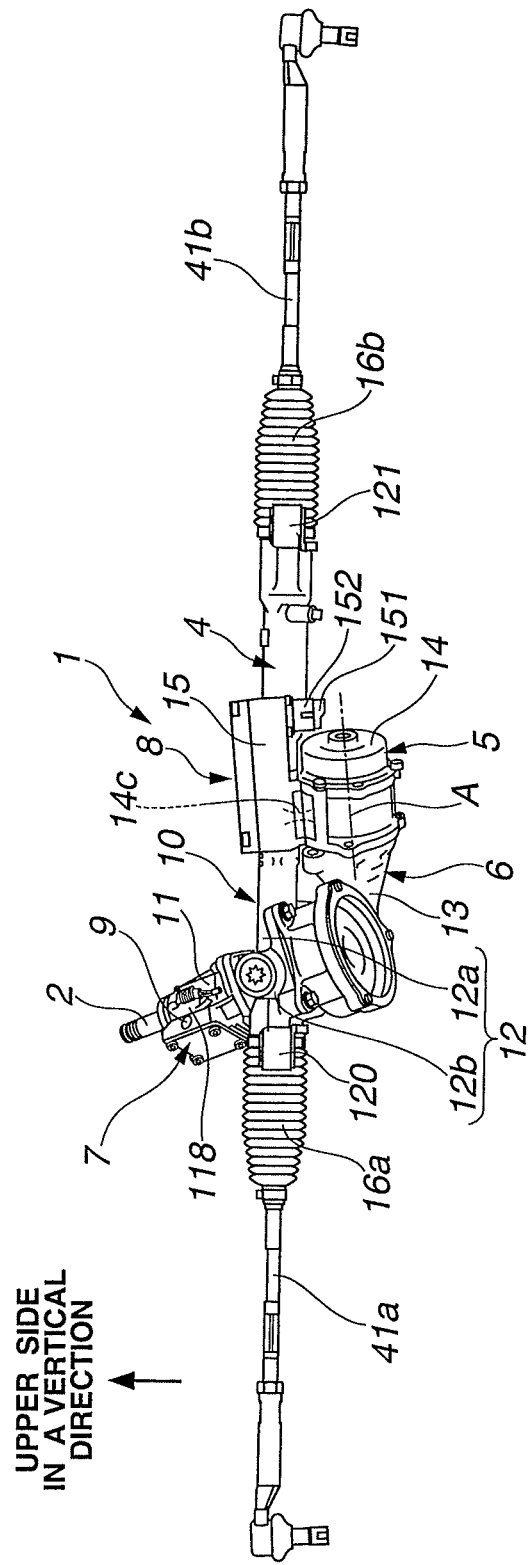
FIG. 6 is a front view of a power steering system, viewed from the front side of the vehicle, of an embodiment 3.

In a power steering system 1 of an embodiment 3, the ECU housing 15 is located at an upper side in the vertical direction with respect to the motor housing 14. FIG. 6 is a front view of the power steering system 1, viewed from the front side of the vehicle, of the embodiment 3. As shown in FIG. 6, the ECU housing 15 is located at the upper side in the vertical direction with respect to the motor housing 14. More specifically, a communication pass or passage 14c (shown by a broken line in FIG. 6) that connects the inside of the ECU housing 15 and the inside of the motor housing 14 is formed at an upper side in the vertical direction with respect to an axis A (a rotation center of the output shaft 50 of the electric motor 5) of the motor housing 14. The other configuration or structure is the same as the embodiment 1, its explanation is thus omitted here.

Next, a function of the power steering system 1 in the embodiment 3 will be explained. In general, technical requirements for contamination control for the inside of the motor housing 14 are lower than those of the inside of the ECU housing 15. Here, in the case of the structure in which the inside of the motor housing 14 and the inside of the ECU housing 15 communicate with each other, there is a risk that contaminants in the motor housing 14 will move into or enter the ECU housing 15. In contrast to this, in the embodiment 3, since the ECU housing 15 is provided at the upper side with respect to the motor housing 14, it is possible to avoid the contaminants entering the ECU housing 15 from the motor housing 14 by the gravitation (the gravity). Here, the ECU housing 15 could be provided so that a part of the ECU housing 15 is set at an overlapping position with the motor housing 14 in the vertical direction.

In the embodiment 3, the communication pass 14c connecting the inside of the ECU housing 15 and the inside of the motor housing 14 is formed at the upper side in the vertical direction with respect to the axis A of the motor housing 14. It is therefore possible to effectively avoid the contaminants entering the ECU housing 15 through the communication pass 14c. Here, a part of an opening of the communication pass 14c which connects with the inside of the motor housing 14 could be positioned at a lower side in the vertical direction with respect to the axis A of the motor housing 14. For example, if half or more of the opening area of the communication pass 14c is set at the upper side in the vertical direction with respect to the axis A of the motor housing 14, the effect of avoiding the contaminants entering the ECU housing 15 can be gained. Further, if the communication pass 14c has a portion that extends upward in the vertical direction from the motor housing 14 to the ECU housing 15, this contaminant-entry avoiding effect can be increased by the gravitation.

Effects of Embodiment 3

From the foregoing, the embodiment 3 includes the following structure or configuration of the power steering system, and has the following effects in addition to the effects (1) and (2) of the embodiment 1.

(1) The ECU housing 15 is located at the upper side in the vertical direction with respect to the motor housing 14.

It is therefore possible to avoid the entry of the contaminants into the ECU housing 15, and the reliability of the ECU 8 can be improved.

(2) The communication pass 14c connecting the inside of the ECU housing 15 and the inside of the motor housing 14 is located at the upper side in the vertical direction with respect to the axis A of the motor housing 14.

It is thus possible to effectively avoid the entry of the contaminants into the ECU housing 15.

Embodiment 4

Figure 7:
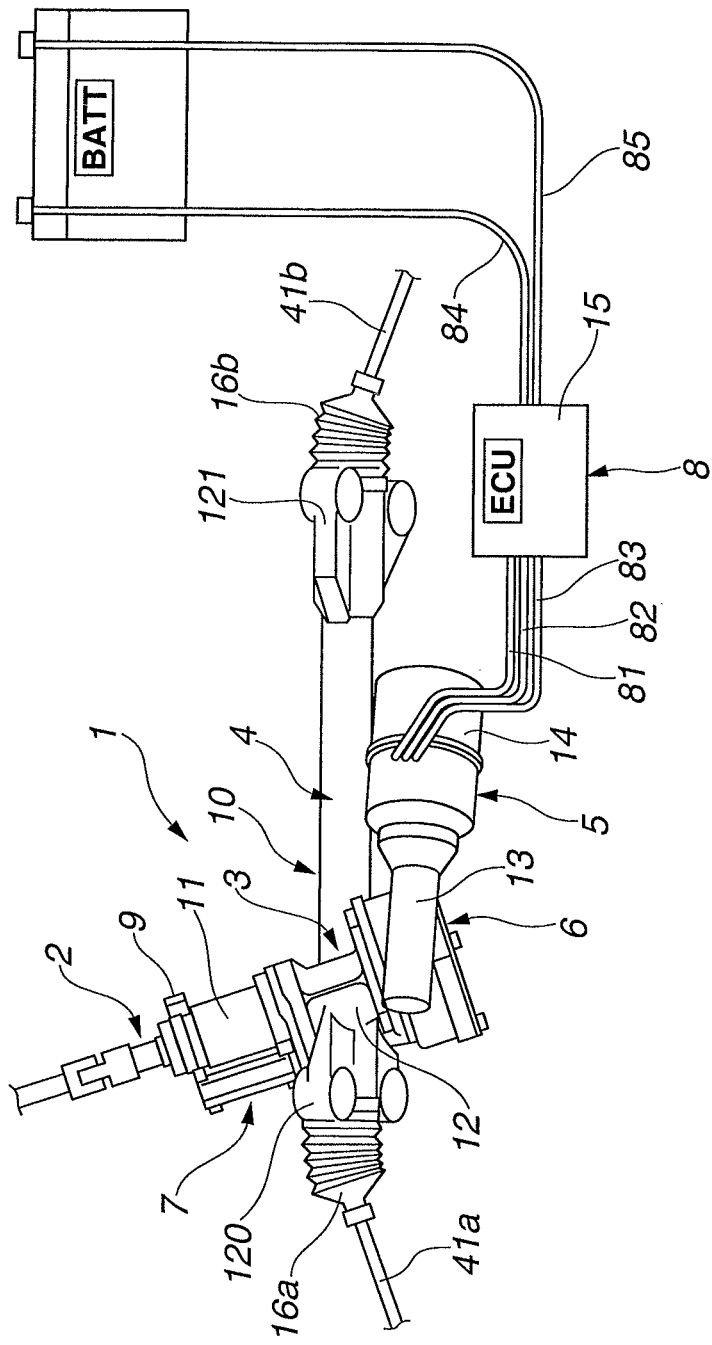
FIG. 7 is a front view of a power steering system, viewed from a substantially front side of the vehicle, of an embodiment 4.

In a power steering system 1 of an embodiment 4, the motor housing 14 and the ECU housing 15 are connected so that their insides communicate with each other by a pipe or a tube. FIG. 7 is a front view of the power steering system 1, viewed from a substantially front side of the vehicle, of the embodiment 4. As shown in FIG. 7, in the system 1, the electric motor 5 and the ECU 8 are not housed in the same housing (namely that it is not the electrical mechanical integrated motor ECU unit), and the motor housing 14 and the ECU housing 15 are connected so that their insides communicate with each other by the pipes (or the tubes), i.e. tubular connecting passages 81, 82 and 83.

Each of the connecting passages 81, 82 and 83 houses therein a wire (a power cable) for electrically connecting the ECU 8 and the electric motor 5 and supplying the drive power from the ECU 8 to the electric motor 5. That is, the connecting passages 81, 82 and 83 are three electric wire sheathing members (protection tubes) that hold therein three power cables for current-supply to the three-phase coil of the motor 5. The connecting passages 81, 82 and 83 are formed by elastic material (resin material such as PVC (polyvinyl chloride)).

The ECU housing 15 is located at a lower side in the vertical direction with respect to the motor housing 14 in the vehicle-mounted state. The respiration valve 9 is provided at the sensor housing 11 with the respiration valve 9 set to the vehicle width inward direction, namely that the respiration valve 9 is set at the sensor housing 11 so that the respiration valve 9 faces to a middle, in the lateral direction, of the vehicle body. The other configuration or structure is the same as the embodiment 1, its explanation is thus omitted here.

Next, a function of the power steering system 1 in the embodiment 4 will be explained. Since the elastic connecting passages 81, 82 and 83 connecting the motor housing 14 and the ECU housing 15 are provided, degree of freedom (flexibility) in the vehicle-mount layout of the ECU housing 15 can be enhanced while connecting the both insides of the motor housing 14 and the ECU housing 15. That is, even in the case where the ECU housing 15 is located, for instance, at the lower side with respect to the motor housing 14 because of restriction of the vehicle-mount layout, by connecting the motor housing 14 and the ECU housing 15 through the connecting passages 81, 82 and 83, the risk of the submersion of the respiration valve 9 when the ECU housing 15 is submerged by the water can be decreased while ensuring the function of the respiration valve 9.

Here, three of the connecting passages 81, 82 and 83 are provide. Thus, as compared with a case where only one connecting passage is provided, an air flow cross section (or an air passing cross section) where the air flows or passes through between the motor housing 14 and the ECU housing 15 can be easily secured. Hence, this facilitates the air pass (breathing) between the inside and the outside of the ECU housing 15.

With this setting of the three connecting passages 81, 82 and 83, the negative pressure that would be produced inside the ECU housing 15 can be reduced, and the reliability of the ECU 8 can be therefore improved.

The number of the connecting passages is not limited to three. For instance, it might be four or more. Further, in the embodiment 4, since the protection tube of the electric wire is used as the connecting passage, increase in the parts count can be suppressed. However, the connecting passage could be provided separately from the protection tube of the electric wire. Moreover, not only the power cable, but also a protection tube of a signal cable might serve as the connecting passage.

The water and mud tend to come to and adhere to the system 1 from an outer side in the vehicle width direction, namely from a steered road wheel side. In the embodiment 4, the respiration valve 9 is set so as to face to the vehicle width inward direction, namely that the respiration valve 9 is set so as to face to the middle in the vehicle width direction. That is to say, the respiration valve 9 is provided at the housing unit 10 (the sensor housing 11) so that the respiration valve 9 is set at an opposite side to the closest steered road wheel, which is an opposite side of an axis (a shaft line) of the steering shaft 2. With this arrangement, the adhesion of the water and the mud to the respiration valve 9 (the filter 91) from the outer side in the vehicle width direction, i.e. from the steered road wheel side, can be suppressed. It is therefore possible to increase the function of the respiration valve 9.

Effects of Embodiment 4

From the foregoing, the embodiment 4 includes the following structure or configuration of the power steering system, and has the following effects in addition to the effects (1) and (2) of the embodiment 1.

(1) The motor housing 14 and the ECU housing 15 are connected so that their insides communicate with each other by the elastic tubular connecting passages 81, 82 and 83.

Degree of freedom (flexibility) in the vehicle-mount layout of the ECU housing 15 can be therefore enhanced.

(2) The ECU housing 15 is located at the lower side in the vertical direction with respect to the motor housing 14.

That is, even in the case where the ECU housing 15 is located at the lower side with respect to the motor housing 14, the risk of the submersion of the respiration valve 9 when the ECU housing 15 is submerged by the water can be decreased while connecting the motor housing 14 and the ECU housing 15.

Embodiment 5

Figure 8:
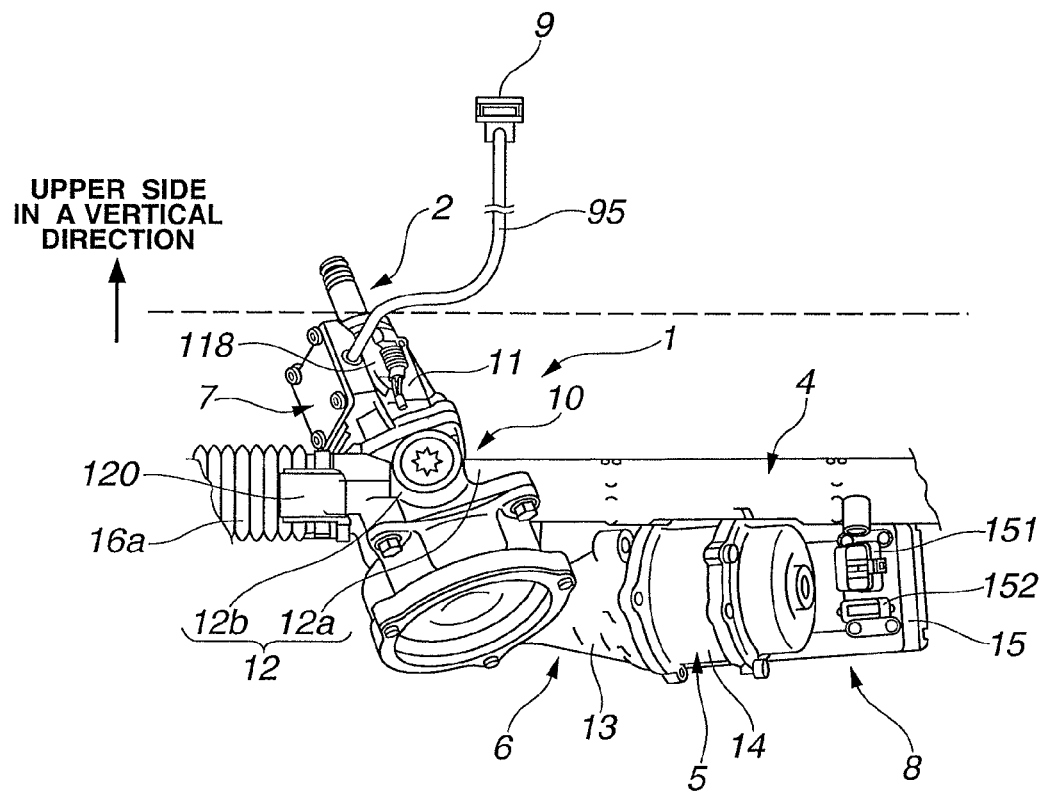
FIG. 8 is a front view of a power steering system, viewed from the front side of the vehicle, of an embodiment 5.

In a power steering system 1 of an embodiment 5, the respiration valve 9 is provided at a top end of a tubular member 95 that is connected to the housing unit 10. FIG. 8 is a front view of the power steering system 1, viewed from the front side of the vehicle, of the embodiment 5. As shown in FIG. 8, the system 1 has the elastic tubular member 95. The tubular member 95 is a hollow connecting member that is formed into a tubular shape. One end side of the tubular member 95 is connected to the sensor housing 11 so as to communicate with the inside of the sensor housing 11, and the respiration valve 9 is provided at the other end side. That is, the respiration valve 9 and the sensor housing 11 are connected so as to communicate with each other by the tubular member 95. The respiration valve 9 is located at an upper side in the vertical direction with respect to the one end side (a connecting portion with the sensor housing 11) of the tubular member 95 in the vehicle-mounted state. More specifically, the respiration valve 9 is located at an upper side in the vertical direction with respect to the sensor housing 11 (the housing unit 10). The other configuration or structure is the same as the embodiment 1, its explanation is thus omitted here.

Next, a function of the power steering system 1 in the embodiment 5 will be explained. Since the respiration valve 9 is located at the upper side with respect to an upper end, in the vertical direction, of the ECU housing 15, it is possible to decrease the risk that both of the ECU housing 15 and the respiration valve 9 are submerged by the water. Further, degree of freedom (flexibility) in the vehicle-mount layout of the respiration valve 9 can be enhanced by the tubular member 95.

In the embodiment 5, the ECU housing 15 is not located at the upper side in the vertical direction with respect to the other housings 11 to 14. Thus, by connecting the one end side of the tubular member 95 to any of the other housings 11 to 14 so as to communicate with its inside and setting the respiration valve 9 (the other end side of the tubular member 95 where the respiration valve 9 is provided) at the upper side in the vertical direction with respect to the one end side of the tubular member 95 in the vehicle-mounted state, the respiration valve 9 is easily and simply positioned at the upper side with respect to the upper end, in the vertical direction, of the ECU housing 15.

In the embodiment 5, the respiration valve 9 (the other end side of the tubular member 95 where the respiration valve 9 is provided) is located at the upper side in the vertical direction with respect to the sensor housing 11 (the housing unit 10). Thus, even in a case where the system 1 is submerged by the water and the surface of the water reaches up to an upper end, in the vertical direction, of the sensor housing 11 as shown by a broken line in FIG. 8, the respiration valve 9 is not submerged by the water. It is therefore possible to further decrease the risk of the submersion of the respiration valve 9.

Here, a middle portion except the both end sides of the tubular member 95 might be positioned at a lower side with respect to the sensor housing 11.

Further, the one end side of the tubular member 95 is connected to any of the housings 11 to 15 so as to communicate with its inside. In the embodiment 5, since the tubular member 95 is set at the sensor housing 11 that is located at the uppermost side in the vertical direction among the housings 11 to 15, a length of the tubular member 95 (the pipe or the tube) can be shortened. In other words, even if the length of the tubular member 95 is shortened, it is possible to easily set the respiration valve 9 (provided at the other end side of the tubular member 95) at the upper side in the vertical direction with respect to the housing unit 10 (the sensor housing 11). Therefore, by shortening the length of the tubular member 95, routing (or handling) of the tubular member 95 after being connected to the sensor housing 11 is made easier. Workability of installation of the system 1 can therefore be improved. In addition, connection (reconnection) of the tubular member 95 after the system 1 is mounted on the vehicle body is also made easier. Thus, if the tubular member 95 should come out of or be detached from the sensor housing 11, it is possible to immediately reconnect the tubular member 95 to the sensor housing 11.

Effects of Embodiment 5

From the foregoing, the embodiment 5 includes the following structure or configuration of the power steering system, and has the following effects in addition to the effect (1) of the embodiment 1.

(1) The system 1 further has the tubular member 95, one end side of which is connected to any of the sensor housing 11, the rack housing 12 and the motor housing 14 so as to communicate with its inside, and the respiration valve 9 is provided at the other end side of which. The respiration valve 9 provided at the other end side of the tubular member 95 is located at the upper side in the vertical direction with respect to the one end side of the tubular member 95 in the vehicle-mounted state.

Therefore, degree of freedom (flexibility) in the vehicle-mount layout of the respiration valve 9 can be enhanced.

(2) The sensor housing 11 is located at the upper side in the vertical direction with respect to the rack housing 12, the motor housing 14 and the ECU housing 15, and the tubular member 95 is set at the sensor housing 11.

It is therefore possible to further decrease the risk of the submersion of the respiration valve 9.

Embodiment 6

Figure 9:
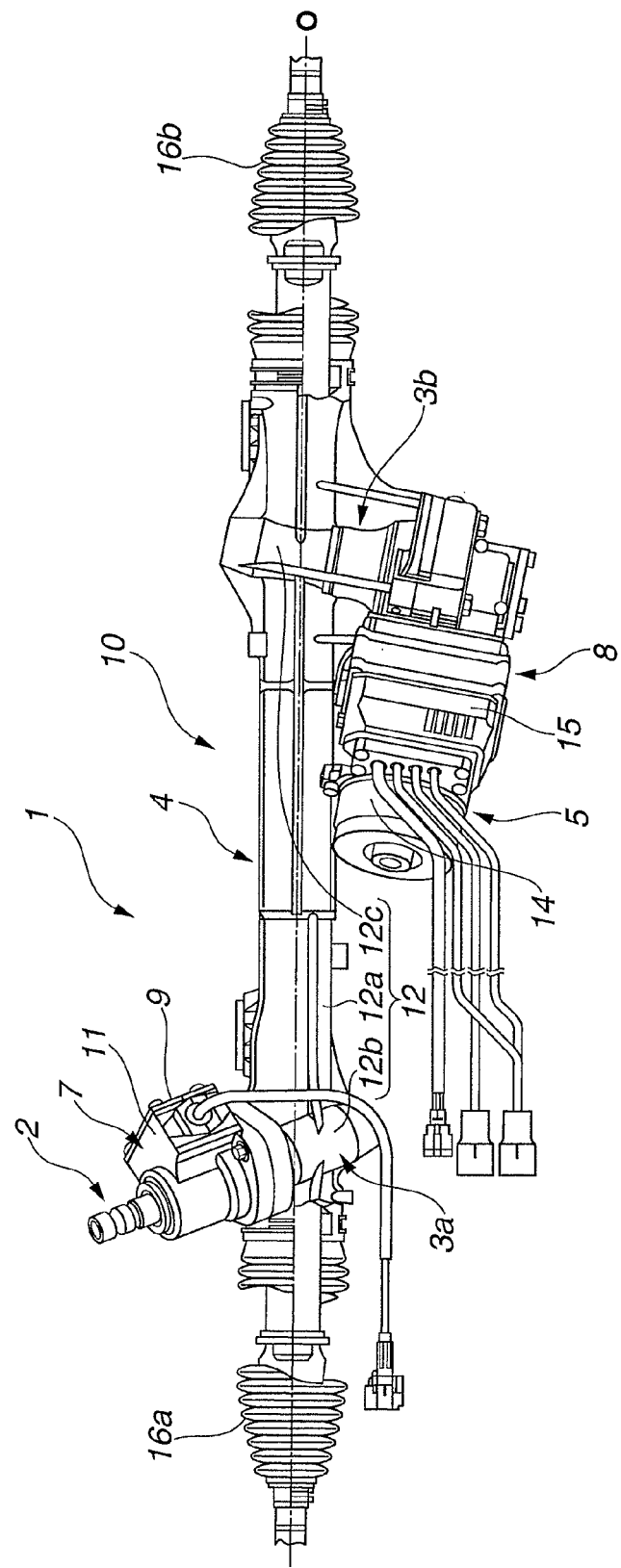
FIG. 9 is a front view of a power steering system, viewed from the substantially front side of the vehicle, of an embodiment 6.

A system 1 of an embodiment 6 is a so-called dual-pinion type power steering system. FIG. 9 is a front view of the power steering system 1, viewed from the substantially front side of the vehicle, of the embodiment 6. As shown in FIG. 9, the rack shaft 4 is provided with not only a first pinion shaft 3a that is linked with the steering shaft 2 but also a second pinion shaft 3b that is separate from the first pinion shaft 3a. Each of the first and second pinion shafts 3a, 3b is installed so as to engage with the rack shaft 4. The electric motor 5 drives rotation of the second pinion shaft 3b, and provides the steering assist force to the rack shaft 4 through the second pinion shaft 3b. That is, the electric motor 5 provides the steering assist force to the rack shaft 4 with the second pinion shaft 3b used as a speed reducer.

The rack housing 12 has, as integral parts, the rack tube 12a, a first gear housing part 12b that houses therein the first pinion shaft 3a and a second gear housing part 12c that houses therein the second pinion shaft 3b. An inside of the second gear housing part 12c communicates with an inside of the rack tube 12a, also communicates with the inside of the motor housing 14. The motor housing 14 and the ECU housing 15 are arranged so as to be separate from the first pinion shaft 3a (the first gear housing part 12b). Each inside of the motor housing 14 and the ECU housing 15 communicates with the inside of the sensor housing 11 through the rack shaft 4 (the rack housing 12).

The motor ECU unit (the motor housing 14 and the ECU housing 15) is located at a lower side in the vertical direction with respect to the rack housing 12. The respiration valve 9 is provided at the sensor housing 11. The other configuration or structure is the same as the embodiment 1, its explanation is thus omitted here.

Next, a function of the power steering system 1 in the embodiment 6 will be explained. In the dual-pinion type power steering system 1 which is capable of high-power and increase of vehicle mountability at the same time by the fact that the steering shaft 2 (the first pinion shaft 3a) and the assist mechanism (the electric motor 5) are separated from each other, the same function/effect as the embodiment 1, which decreases the risk that both of the ECU housing 15 and the respiration valve 9 are submerged by the water, can be gained.

Here, in the embodiment 6, the second pinion shaft 3b is provided as a gear (the speed reducer) that provides the steering assist force to the rack shaft 4. However, the present invention (arrangement of the respiration valve) could be applied to the rack assist type power steering system using the ball-and-nut mechanism instead of the second pinion shaft 3b.

Effects of Embodiment 6

From the foregoing, the embodiment 6 includes the following structure or configuration of the power steering system, and has the following effects in addition to the effect (1) of the embodiment 1.

(1) The speed reducer connected to the electric motor 5 is the ball-and-nut mechanism provided at the rack shaft 4 or the second pinion shaft 3b provided so as to be separate from the pinion shaft (the first pinion shaft 3a) and engage with the rack shaft 4. The electric motor 5 is installed so as to provide the steering assist force to the rack shaft 4 through the speed reducer (the ball-and-nut mechanism or the second pinion shaft 3b). The motor housing 14 and the ECU housing 15 are arranged so as to be separate from the pinion shaft (the first pinion shaft 3a), and each inside of the motor housing 14 and the ECU housing 15 communicates with the inside of the sensor housing 11 through the rack shaft 4 (the rack housing 12). The respiration valve 9 is provided at the sensor housing 11.

It is therefore possible to decrease the risk that both of the ECU housing 15 and the respiration valve 9 are submerged by the water while realizing the high-power and increase of the vehicle mountability of the system 1 at the same time.

Embodiment 7

Figure 10:
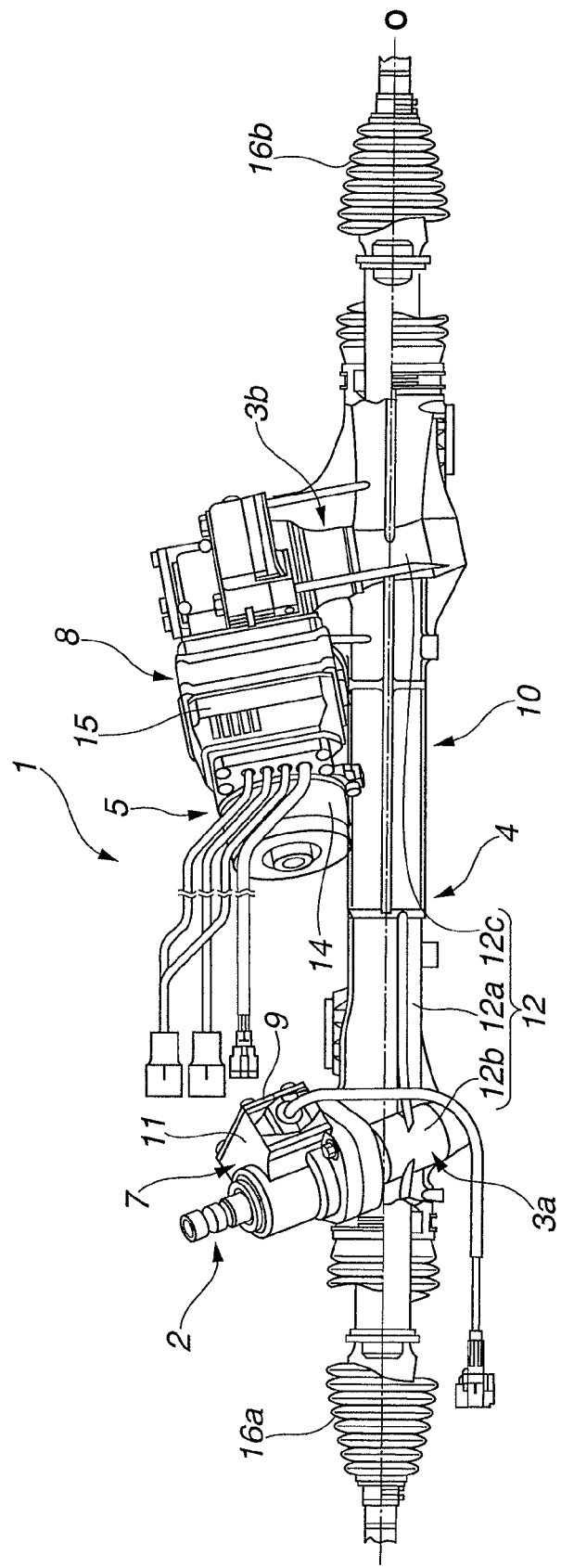
FIG. 10 is a front view of a power steering system, viewed from the substantially front side of the vehicle, of an embodiment 7.

A system 1 of an embodiment 7 is the same dual-pinion type power steering system as the embodiment 6. FIG. 10 is a front view of the power steering system 1, viewed from the substantially front side of the vehicle, of the embodiment 7. As shown in FIG. 10, the motor ECU unit (the motor housing 14 and the ECU housing 15) is located at an upper side in the vertical direction with respect to the rack housing 12. Further, an opening (of the inside) of the ECU housing 15, which communicates with the inside of the rack housing 12 (the second gear housing part 12c), is located at an upper side in the vertical direction with respect to a lower end, in the vertical direction, of the rack housing 12 (the rack tube 12a). More specifically, the opening (of the inside) of the ECU housing 15 is located at the upper side in the vertical direction with respect to an axis O (a center line O) of the rack housing 12 (the rack tube 12a). The other configuration or structure is the same as the embodiment 6, its explanation is thus omitted here.

Next, a function of the power steering system 1 in the embodiment 7 will be explained. In the embodiment 7, the ECU housing 15 is arranged so as to be separate from the first pinion shaft 3a (the first gear housing part 12b). Further, the opening of the ECU housing 15, communicating with the inside of the rack housing 12, is located at the upper side in the vertical direction with respect to the lower end, in the vertical direction, of the rack housing 12 (the rack tube 12a). Thus, even if the water enters the system from the respiration valve 9, first the water collects inside the rack housing 12 (the rack tube 12a) (at a lower end in the vertical direction of the rack housing 12) through the sensor housing 11 and the first gear housing part 12b. As long as the water level of the water collecting inside the rack housing 12 (the rack tube 12a) does not rise up to the opening of the ECU housing 15, the water does not enter the ECU housing 15. It is therefore possible to avoid the water entering the ECU housing. 15.

In the embodiment 7, since the opening of the ECU housing 15 is located at the upper side in the vertical direction with respect to the center line O of the rack housing 12, the entry of the water into the ECU housing 15 is suppressed until the water level of the water collecting in the rack housing 12 reaches up to at least the center line O of the rack housing 12. Thus, the entry of the water into the ECU housing 15 can be further suppressed.

Effects of Embodiment 7

From the foregoing, the embodiment 6 includes the following structure or configuration of the power steering system, and has the following effect in addition to the same effects as the embodiment 6.

(1) The opening of the ECU housing 15, which communicates with the inside of the rack housing 12, is located at the upper side in the vertical direction with respect to the center line O of the rack housing 12.

It is therefore possible to suppress the entry of the water into the ECU housing 15, and the reliability of the ECU 8 can be improved.

Embodiment 8

Figure 11:
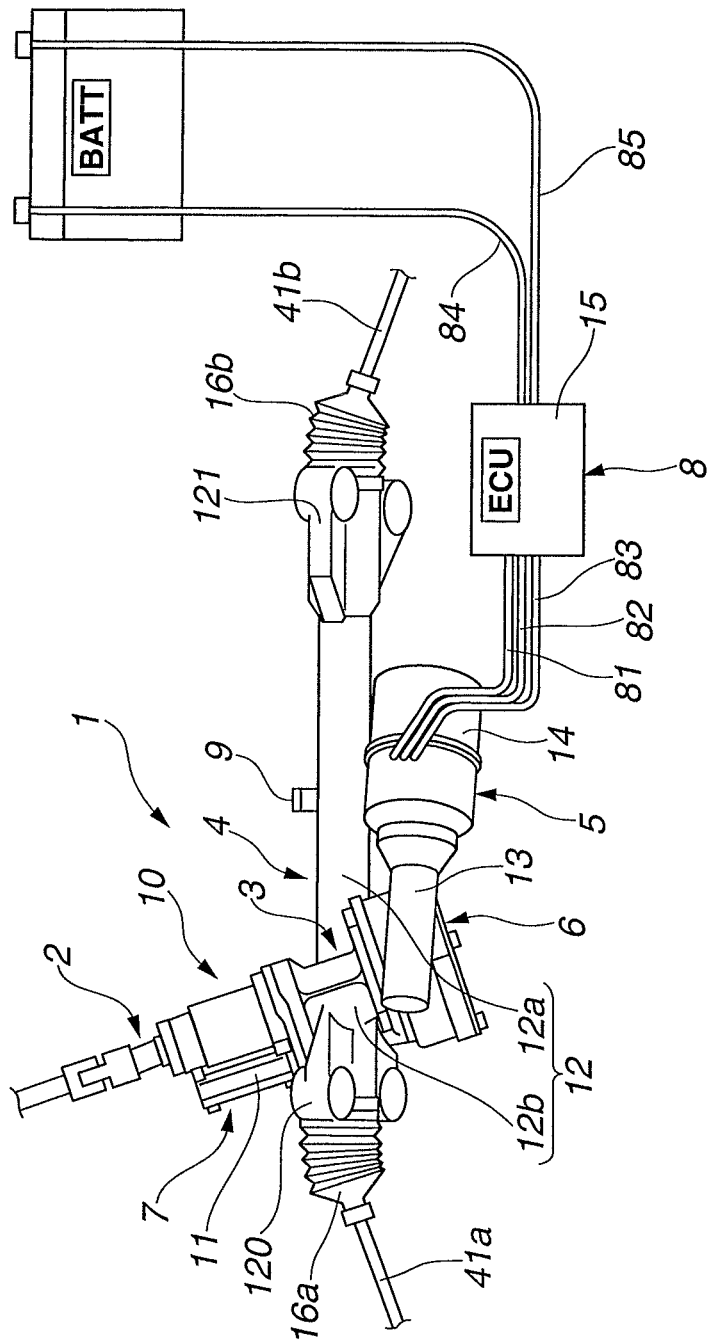
FIG. 11 is a front view of a power steering system, viewed from the substantially front side of the vehicle, of an embodiment 8.

In a power steering system 1 of an embodiment 8, the respiration valve 9 is provided at the rack housing 12. FIG. 11 is a front view of the power steering system 1, viewed from the substantially front side of the vehicle, of the embodiment 8. As shown in FIG. 11, as same as the embodiment 4, the motor housing 14 and the ECU housing 15 are separately provided, and their insides communicate with each other by the connecting passages 81, 82 and 83. The respiration valve 9 is set at an upper side in the vertical direction also a substantially middle position, in the axial direction (in the shaft direction), of the rack tube 12a of the rack housing 12. The ECU housing 15 is located at a lower side in the vertical direction with respect to the rack housing 12, also located at a lower side in the vertical direction with respect to the motor housing 14. The other configuration or structure is the same as the embodiment 1, its explanation is thus omitted here.

Next, a function of the power steering system 1 in the embodiment 8 will be explained. The respiration valve 9 is provided at the rack housing 12. Further, the ECU housing 15 is located at the lower side in the vertical direction with respect to the rack housing 12, namely that the ECU housing 15 is located at the lower side in the vertical direction with respect to the respiration valve 9. It is therefore possible to decrease the risk that both of the ECU housing 15 and the respiration valve 9 are submerged by the water. Here, the respiration valve 9 could be set at a portion except the upper side, in the vertical direction, of the rack tube 12a. For instance, the respiration valve 9 could be set at a lower side, in the vertical direction, of the rack tube 12a.

In the embodiment 8, since the respiration valve 9 is set at the upper side, in the vertical direction, of the rack tube 12a, the risk of the submersion of the respiration valve 9 can be decreased.

Further, the motor housing 14 and the ECU housing 15 could be provided as an integral or combined housing.

In the embodiment 8, the motor housing 14 and the ECU housing 15 are separately provided, and their insides communicate with each other by the connecting passages 81, 82 and 83. Thus, as same as the embodiment 4, degree of freedom (flexibility) in the vehicle-mount layout of the ECU housing 15 can be enhanced, and the risk of the submersion of the respiration valve 9 when the ECU housing 15 is submerged by the water can be decreased.

In addition, the respiration valve 9 is provided at an inner side in the vehicle width direction, namely that the respiration valve 9 is provided at the substantially middle position, in the axial direction, of the rack tube 12a, which is away from the both steered road wheels in the shaft direction of the rack shaft 4. Thus, the adhesion of the water and the mud to the respiration valve 9 (the filter 91) from the steered road wheel side, can be suppressed, and it is possible to increase the function of the respiration valve 9.

Effects of Embodiment 8

From the foregoing, the embodiment 8 includes the following structure or configuration of the power steering system, and has the following effects in addition to the effect (1) of the embodiment 1.

(1) The respiration valve 9 is provided at the rack housing 12.

Even though the respiration valve 9 is provided at the rack housing 12, the risk of the submersion of the respiration valve 9 when the ECU housing 15 is submerged by the water can be decreased.

Embodiment 9

Figure 12:
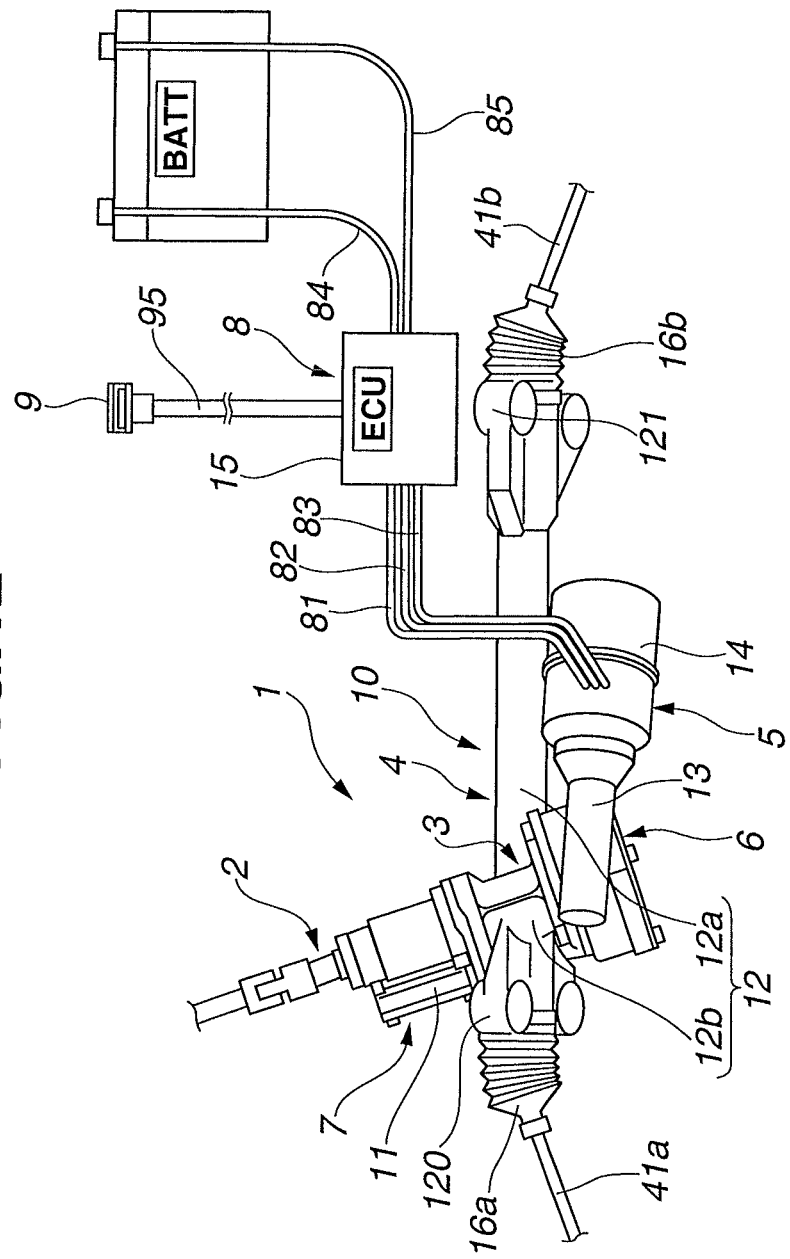
FIG. 12 is a front view of a power steering system, viewed from the substantially front side of the vehicle, of an embodiment 9.

In a power steering system 1 of an embodiment 9, the respiration valve 9 is provided at the top end of the tubular member 95 that is connected to the ECU housing 15. The tubular member 95 is a different member from a protection tube of the power cable connected to the ECU 8. FIG. 12 is a front view of the power steering system 1, viewed from the substantially front side of the vehicle, of the embodiment 9. As shown in FIG. 12, the system 1 has the same tubular member 95 as the embodiment 5. The one end side of the tubular member 95 is connected to the ECU housing 15 so as to communicate with the inside of the ECU 8 (the ECU housing 15), and the respiration valve 9 is provided at the other end side. That is, the respiration valve 9 and the ECU housing 15 are connected so as to communicate with each other by the tubular member 95. The other end side (i.e. the respiration valve 9) of the tubular member 95 is located at an upper side with respect to an upper end, in the vertical direction, of the ECU housing 15 also at an upper side in the vertical direction with respect to the sensor housing 11, in the vehicle-mounted state.

As same as the embodiment 4, the motor housing 14 and the ECU housing 15 are separately provided, and their insides communicate with each other by three electric wires (the connecting passages 81, 82 and 83). The ECU housing 15 is located at an upper side in the vertical direction with respect to the motor housing 14 also at an upper side in the vertical direction with respect to the rack housing 12. The other configuration or structure is the same as the embodiment 1, its explanation is thus omitted here.

Next, a function of the power steering system 1 in the embodiment 9 will be explained. Since the respiration valve 9 is located at the upper side with respect to the upper end, in the vertical direction, of the ECU housing 15, it is possible to decrease the risk that both of the ECU housing 15 and the respiration valve 9 are submerged by the water. Further, as same as the embodiment 5, degree of freedom (flexibility) in the vehicle-mount layout of the respiration valve 9 can be enhanced by the tubular member 95. For instance, by setting the respiration valve 9 (the other end side of the tubular member 95 where the respiration valve 9 is provided) at the upper side in the vertical direction with respect to the sensor housing 11 (the housing unit 10), the risk of the submersion of the respiration valve 9 can be decreased.

As same as the embodiment 4, by separately providing the motor housing 14 and the ECU housing 15, degree of freedom (flexibility) in the vehicle-mount layout of the ECU housing 15 can be enhanced. Here, the motor housing 14 and the ECU housing 15 could be provided as an integral or combined housing.

Further, the ECU housing 15 could be located at a lower side in the vertical direction with respect to the motor housing 14.

In the embodiment 9, the ECU housing 15 (to which the tubular member 95 is connected) is located at the upper side in the vertical direction with respect to the motor housing 14. It is therefore possible to decrease the risk of the submersion of the ECU housing 15.

Moreover, as same as the embodiment 5, even if the length of the tubular member 95 is shortened, it is possible to easily set the respiration valve 9 at the upper side in the vertical direction with respect to the housing unit 10 (the sensor housing 11). Also, it is possible to prevent the other member (e.g. the rack tube 12a) of the system 1 from being located at the upper side in the vertical direction with respect to a connecting portion of the tubular member 95 with the ECU housing 15. Therefore, routing (or handling) of the tubular member 95 after being connected to the ECU housing 15 is made easier, and workability of installation of the system 1 can be improved. Furthermore, after the system 1 is mounted on the vehicle body, if the tubular member 95 should come out of or be detached from the ECU housing 15, it is possible to immediately reconnect the tubular member 95 to the ECU housing 15.

Effects of Embodiment 9

From the foregoing, the embodiment 9 includes the following structure or configuration of the power steering system, and has the following effects.

(1) The system 1 has the tubular member 95, one end side of which is connected to the ECU housing 15 so as to communicate with the inside of the ECU housing 15, and the other end side of which is located at the upper side with respect to the upper end, in the vertical direction, of the ECU housing 15 in the vehicle-mounted state, and also has the respiration valve 9 which is provided at the other end side of the tubular member 95 and by which the air in the ECU housing 15 can pass through each house and between the inside and the outside of the ECU housing 15 in the bidirectional direction so as to absorb change of expansion/contraction of the air in the ECU housing 15 while suppressing infiltration (entry) of the water into the inside of the ECU housing 15 from the outside.

Thus, it is possible to decrease the risk that both of the ECU housing 15 and the respiration valve 9 are submerged by the water, and the reliability of the ECU 8 can be therefore improved. Also, degree of freedom (flexibility) in the vehicle-mount layout of the respiration valve 9 can be enhanced.

(2) The motor housing 14 and the ECU housing 15 are separately provided, and their insides communicate with each other by the elastic electric signal line (the connecting passages 81, 82 and 83).

Therefore, degree of freedom (flexibility) in the vehicle-mount layout of the ECU housing 15 can be enhanced.

(3) The ECU housing 15 is located at the upper side in the vertical direction with respect to the motor housing 14.

It is therefore possible to decrease the risk of the submersion of the ECU housing 15, and to improve the workability of installation of the system 1.

Embodiment 10

Figure 13:
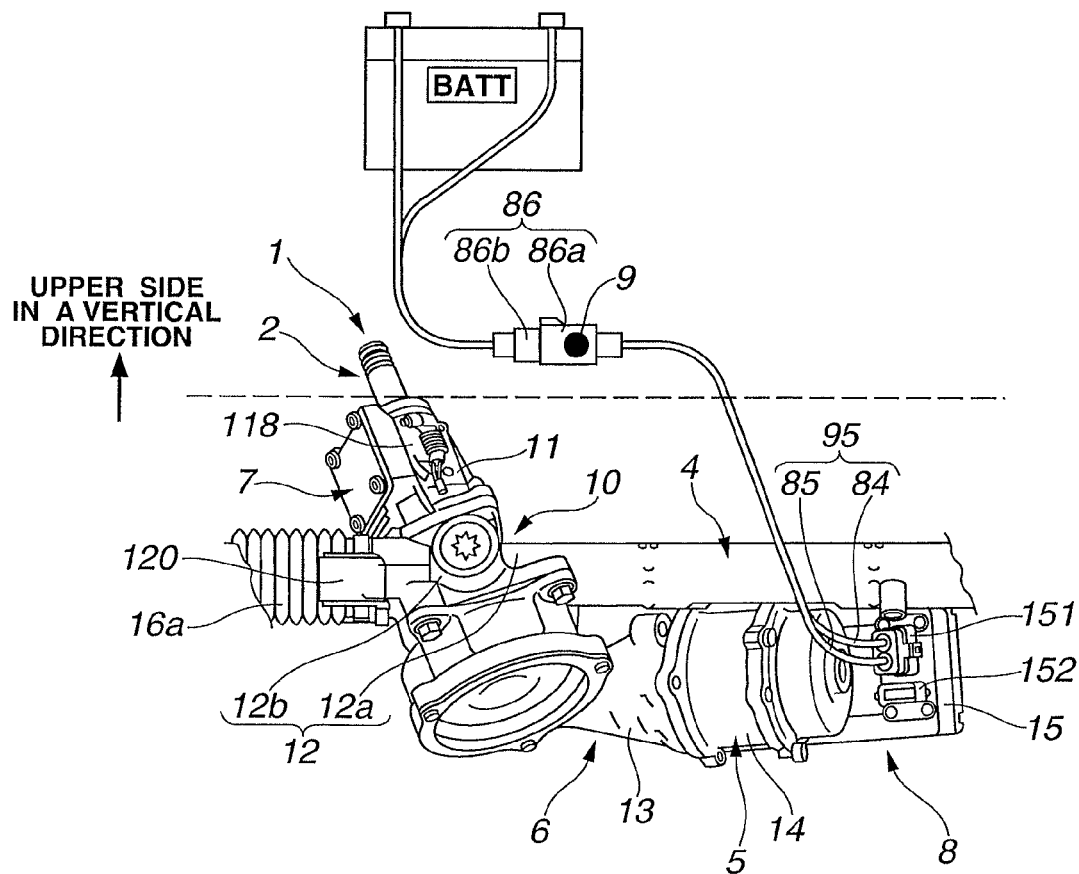
FIG. 13 is a front view of a power steering system, viewed from the front side of the vehicle, of an embodiment 10.

In a power steering system 1 of an embodiment 10, the protection tube of the power cable connected to the ECU 8 serves also as the tubular member 95 of the embodiment 9. FIG. 13 is a front view of the power steering system 1, viewed from the front side of the vehicle, of the embodiment 10. As shown in FIG. 13, the one end side of the tubular member 95 is connected to the ECU housing 15 so as to communicate with the inside of the ECU housing 15, and the respiration valve 9 is provided at the other end side. That is, as same as the embodiment 5, the respiration valve 9 is provided at the top end of the tubular member 95 that is connected to the housing unit 10. The tubular member 95 is the protection tube for covering the power cable (or is a part of the protection tube for covering a part of the power cable at its axial direction ECU housing 15 side) that supplies the power to the ECU 8 from the vehicle-mounted battery BATT. More specifically, the tubular member 95 is an elastic harness that houses therein two electric wire sheathing members 84, 85 together, each of which covers the power cable.

One end of the tubular member 95 is provided with a connector 151, and the other end is provided with a connector 86a. The connector 151 is connected to the ECU 8 so as to communicate with the inside of the ECU housing 15. The connector 86a is a female connector, and is connected to a connector 86b (a male connector). A connector 86 is formed by these male and female connectors 86b, 86a. The male connector 86b is provided at an end of a harness that is connected to the battery BATT. The connector 86a is provided with the respiration valve 9. That is, the respiration valve 9 is provided at the intermediate connector 86 (the connector 86a) of the harness that connects the battery BATT and the ECU 8.

The respiration valve 9 is located at an upper side with respect to an upper end, in the vertical direction, of the ECU housing 15 in the vehicle-mounted state. For instance, the respiration valve 9 is located at an upper side in the vertical direction with respect to the sensor housing 11. The other configuration or structure is the same as the embodiment 1, its explanation is thus omitted here.

Next, a function of the power steering system 1 in the embodiment 10 will be explained. Since the tubular member 95 can be used also as the protection tube of the power-supply line (the power cable), the risk of the submersion of the respiration valve 9 when the ECU housing 15 is submerged by the water can be decreased while suppressing the increase in the parts count. Especially when the intermediate connector 86 of the harness connecting the battery BATT and the ECU 8 is provided at a relatively high position in the engine room, by setting the respiration valve 9 at this intermediate connector 86, the risk of the submersion of the respiration valve 9 can be decreased more effectively. For example, when the intermediate connector 86 is located at the upper side in the vertical direction with respect to the sensor housing 11 (the housing unit 10), even if the system 1 is submerged by the water and the surface of the water reaches up to an upper end, in the vertical direction, of the sensor housing 11 as shown by a broken line in FIG. 13, the respiration valve 9 is not submerged by the water.

Effects of Embodiment 10

From the foregoing, the embodiment 10 includes the following structure or configuration of the power steering system, and has the following effects in addition to the effect (1) of the embodiment 9.

(1) The tubular member 95 is provided so as to cover the power cable at the ECU housing 15 side which is a part, in the axial direction, of the whole power cable that supplies the power from the vehicle-mounted battery BATT to the ECU housing 15 (the ECU 8).

Thus, the tubular member 95 can be used as the protection tube for covering the power cable, and the increase in the parts count can be suppressed.

Embodiment 11

Figure 14:
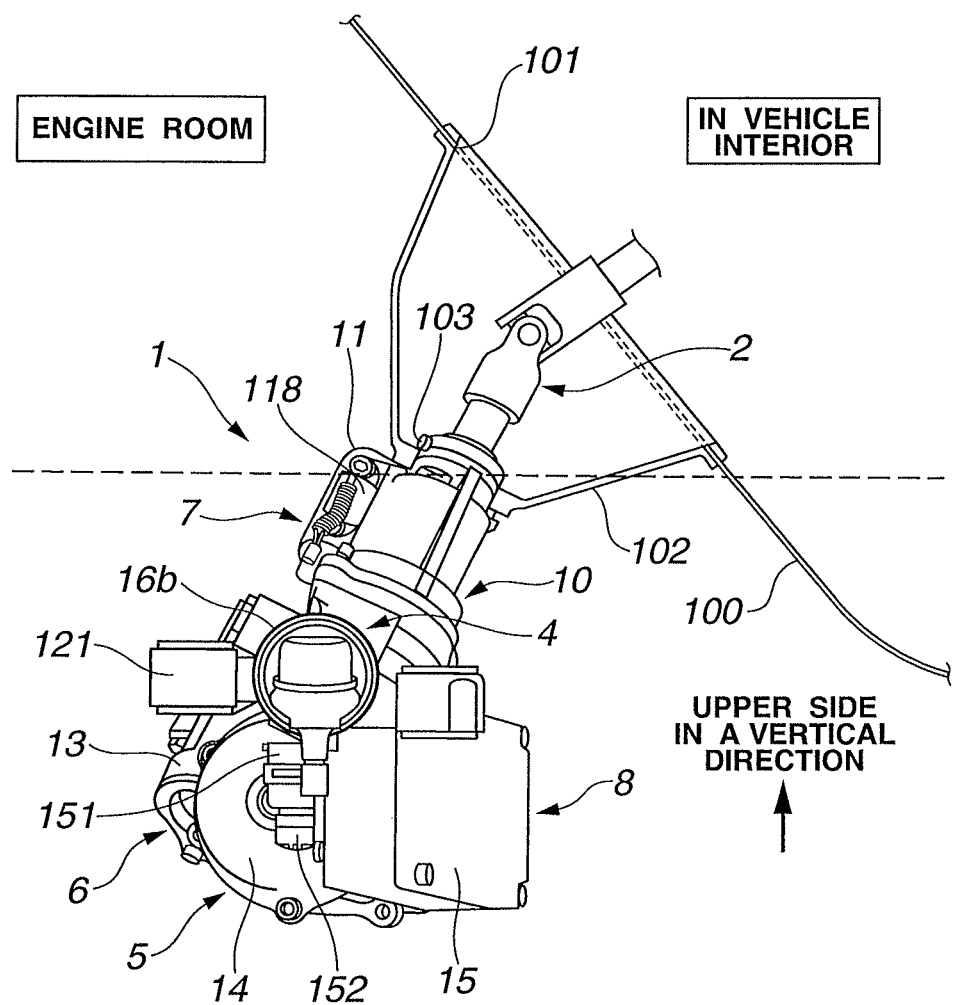
FIG. 14 is a side view of a power steering system, viewed from a side of the vehicle, of an embodiment 11.

In an embodiment 11, a power steering system 1 has, as the respiratory structure of the housing unit 10, a seal member which connects the inside of the housing unit 10 and the vehicle interior so as to communicate with each other and suppresses entry of the water from the outside of the housing unit 10 (from the engine room), instead of the respiration valve 9. FIG. 14 is a side view of the power steering system 1, viewed from a side of the vehicle, of the embodiment 11. As shown in FIG. 14, a partition wall 100 by which the vehicle engine room and the vehicle interior are partitioned and defined is provided between them. More specifically, a floor panel of the vehicle interior is provided. The partition wall 100 has a penetration hole 101.

The steering shaft 2 is set so as to penetrate the partition wall 100 through the penetration hole 101. A cylindrical boot 102 is provided between the housing unit 10 (the sensor housing 11) linked with the steering wheel installed inside the vehicle interior and the partition wall 100 so as to cover or enclose the steering shaft 2. The boot 102 is formed by an elastic material such as rubber. An upper end, in the vertical direction, of the boot 102 is set at the partition wall 100 (at an inner circumference of the penetration hole 101), and a lower end, in the vertical direction, of the boot 102 is set at an upper end of the sensor housing 11, thereby closing the penetration hole 101 and defining the engine room and the vehicle interior.

Further, a communication hole 103 through which the inside and the outside of the sensor housing 11 communicate with each other is formed, by penetrating the sensor housing 11, at the upper end of the sensor housing 11. The communication hole 103 is arranged so as to open in an inside of the boot 102, i.e. at a side (in the vehicle interior) where the steering shaft 2 is housed. The boot 102 is the seal member by which the inside of the housing unit 10 and the vehicle interior communicate with each other also the entry of the water into the inside of the housing unit 10 from the outside of the housing unit 10 (from the engine room) is suppressed. The other configuration or structure is the same as the embodiment 1, its explanation is thus omitted here.

Next, a function of the power steering system 1 in the embodiment 11 will be explained. The housing unit 10 communicates with the vehicle interior while being divided from the engine room by the boot 102 as the seal member (and the communication hole 103). It is therefore possible to avoid the water entering the housing unit 10. Further, even if the ECU housing 15 is completely submerged by the water, since the air flows or passes through between the inside of the housing unit 10 and the vehicle interior through the communication hole 103, a volume change of the air in the ECU housing 15 can be absorbed. For instance, even if the system 1 is submerged by the water and the surface of the water reaches up to an upper end, in the vertical direction, of the sensor housing 11 as shown by a broken line in FIG. 14, the breathing between the inside and the outside of the housing unit 10 is possible. The reliability of the ECU 8 can be therefore improved.

Further, the steering shaft 2 penetrates the partition wall 100 and is linked with the steering wheel installed inside the vehicle interior. In other words, in the embodiment 11, the penetration hole 101 formed on the partition wall 100 for setting the steering shaft 2 and the boot 102 serve also as a respiratory communication passage of the ECU housing 15 (the housing unit 10). This thus suppresses the increase in the parts count.

Here, the seal member is not limited to the boot 102. The other member could be used as the respiratory communication passage as long as it has a structure that protrudes toward the engine room (in an outward direction from the vehicle interior) from the partition wall 100 by which the engine room and the vehicle interior are partitioned.

Effects of Embodiment 11

From the foregoing, the embodiment 11 includes the following structure or configuration of the power steering system, and has the following effects.

(1) The system 1 has the seal member (the boot 102) which is provided between the housing unit 10 formed by the sensor housing 11, the rack housing 12, the motor housing 14 and the ECU housing 15 so that their insides communicate with each other and the partition wall 100 by which the vehicle engine room and the vehicle interior are partitioned, and by which the inside of the housing unit 10 and the vehicle interior communicate with each other also the entry of the water from the outside is suppressed.

Thus, the housing unit 10 communicates with the vehicle interior while being divided from the engine room. Hence, even in the case where the ECU housing 15 is submerged by the water, the volume change of the air in the ECU housing 15 can be absorbed, and the reliability of the ECU 8 can be improved.

(2) The seal member is the cylindrical boot 102 provided between the sensor housing 11 and the partition wall 100 so as to enclose the steering shaft 2.

Thus, the structure for setting the steering shaft 2 serves also as the respiratory communication passage of the ECU housing 15, thereby suppressing the increase in the parts count.

Embodiment 12

Figure 15:
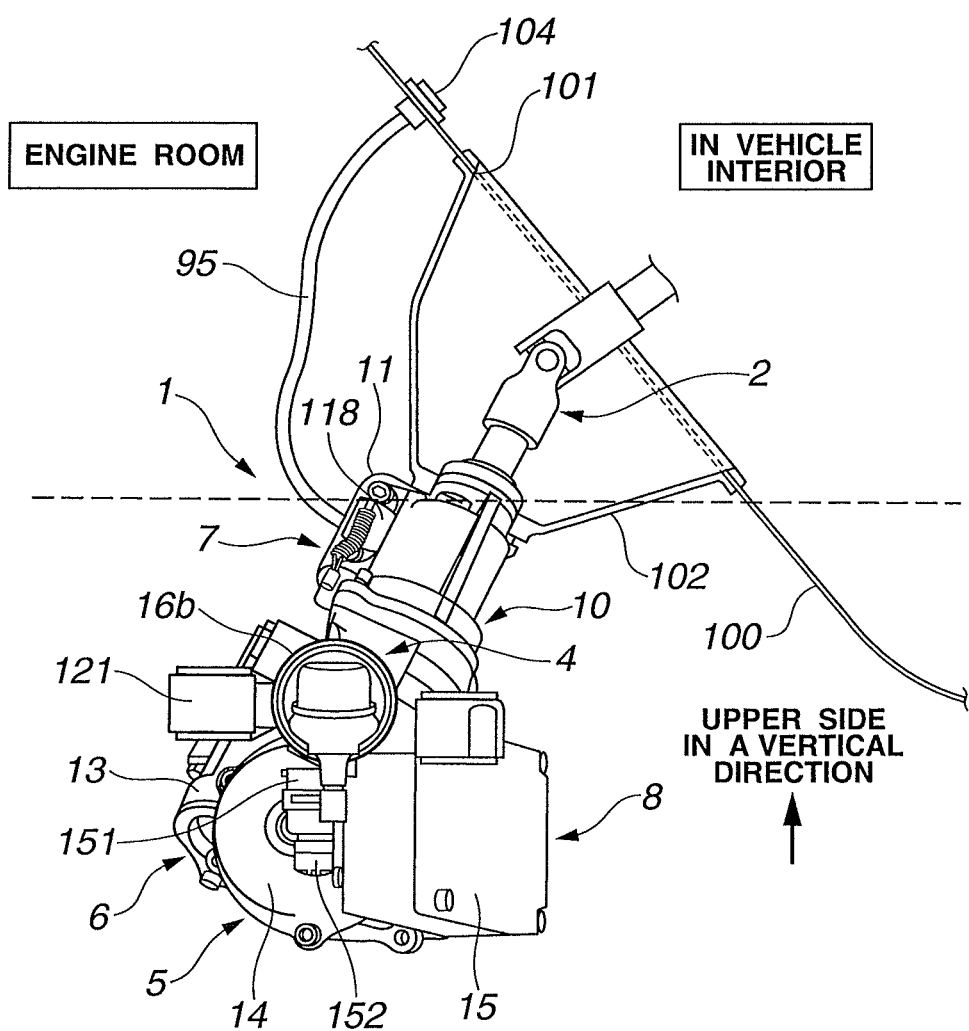
FIG. 15 is a side view of a power steering system, viewed from the side of the vehicle, of an embodiment 12.

In an embodiment 12, as same as the embodiment 11, instead of the respiration valve 9 as the respiratory structure of the housing unit 10, a power steering system 1 has the seal member. However, the power steering system 1 does not use the boot 102 as the seal member, but uses the tubular member 95. FIG. 15 is a side view of the power steering system 1, viewed from the side of the vehicle, of the embodiment 12. As shown in FIG. 15, the system 1 has the tubular member (a hose) 95 which is formed into a tubular shape by the elastic material and connects the housing unit 10 and the partition wall 100.

One end side of the tubular member 95 is connected to the sensor housing 11 so as to communicate with the inside of the sensor housing 11, and the other end side is connected to the partition wall 100 through a connecting member 104 so as to communicate with the vehicle interior. In other words, the tubular member 95 is the seal member by which the inside of the housing unit 10 and the vehicle interior communicate with each other also the entry of the water into the inside of the housing unit 10 from the outside of the housing unit 10 (from the engine room) is suppressed. The other configuration or structure is the same as the embodiment 1, its explanation is thus omitted here.

Next, a function of the power steering system 1 in the embodiment 12 will be explained. The housing unit 10 communicates with the vehicle interior while being divided from the engine room by the tubular member 95 as the seal member. Thus, as same as the embodiment 11, for instance, even if the system 1 is submerged by the water and the surface of the water reaches up to an upper end, in the vertical direction, of the sensor housing 11 as shown by a broken line in FIG. 15, it is possible to avoid the water entering the housing unit 10, and this allows the breathing between the inside and the outside of the housing unit 10. The reliability of the ECU 8 can be therefore improved.

Further, by forming the seal member by the tubular member 95, degree of freedom (flexibility) in the vehicle-mount layout of the seal member can be enhanced.

Here, the tubular member 95 could be connected to the other housings 12 to 15 except the sensor housing 11.

In the embodiment 12, the tubular member 95 is connected to the sensor housing 11. As a consequence, the same function/effect as the embodiment 5, which makes reconnection of the tubular member 95 to the sensor housing 11 easier and improves the workability of installation of the system 1, can be gained.

Here, a wire sheathing member (a cable harness) that extends from the engine room to the inside of the vehicle interior could be used as the tubular member 95.

Effects of Embodiment 12

From the foregoing, the embodiment 12 includes the following structure or configuration of the power steering system, and has the following effects in addition to the effect (1) of the embodiment 11.

(1) The seal member is the hose (the tubular member) 95 formed into the tubular shape by the elastic material and connecting the housing unit 10 and the partition wall 100.

Thus, degree of freedom (flexibility) in the vehicle-mount layout of the seal member can be enhanced.

Other Embodiment

Although the power steering system according to the present invention has been explained on the basis of the embodiments 1 to 12, the present invention is not limited to the embodiments 1 to 12. For instance, the structures of the embodiments 1 to 12 might be combined.

The above embodiments can produce advantageous effects as described above. In addition to that, modified examples having substantially the same effects as the above embodiments will be explained below.

(A1) A power steering system mounted in an engine room in a vehicle and providing a steering assist force to steered road wheels, has: a steering shaft (2) to which a turning force from a steering wheel is transmitted; a pinion shaft (3) which is provided at the steering shaft (2); a torque sensor (7) which is provided at the steering shaft (2), has a coil (70) in a sensor housing (11) and detects a steering torque generated at the steering shaft (2); a rack housing (12) whose inside space communicates with an inside space of the sensor housing (11); a rack shaft (4) which is provided movably in a shaft direction thereof in the rack housing (12) and converts a turning motion of the steering shaft (2) to a shaft direction movement of the steered road wheels by engaging with the pinion shaft (3); a motor housing (14) whose inside space communicates with the inside space of the rack housing (12); an electric motor (5) which is provided in the motor housing (14), has a stator and a rotor and provides the steering assist force to the pinion shaft (3) or the rack shaft (4) through a speed reducer (6); an ECU housing (15) whose inside space communicates with the inside space of the motor housing (14); a motor control unit (8) which is housed in the ECU housing (15) and has electronic elements that control drive of the electric motor (5) on the basis of the steering torque; and a respiration valve (9) which is provided at any of the sensor housing (11), the rack housing (12) and the motor housing (14) and is located at an upper side with respect to an upper end, in a vertical direction, of the ECU housing (15) in a state in which the power steering system (1) is mounted in a vehicle body (in a vehicle-mounted state). The respiration valve (9) has a function by which air can pass through each house and between an inside and an outside of the ECU housing (15) in a bidirectional direction so as to absorb change of expansion/contraction of the air in the ECU housing (15) while suppressing entry of water from the outside.

(A2) In the power steering system, the sensor housing (11) is located at an upper side in the vertical direction with respect to the rack housing (12), the motor housing (14) and the ECU housing (15), and the respiration valve (9) is provided at the sensor housing (11).

(A3) In the power steering system, the sensor housing (11) is formed by resin material by molding.

(A4) In the power steering system, the sensor housing (11) is provided with a respiration valve housing portion (94) having an opening portion (940) that opens toward a lower side in the vertical direction, and the respiration valve (9) is set at an upper side in the vertical direction with respect to the opening portion (940) in the respiration valve housing portion (94).

(A5) In the power steering system, the respiration valve (9) is formed integrally with the sensor housing (11) by the molding.

(A6) In the power steering system, the ECU housing (15) is located at an upper side in the vertical direction with respect to the motor housing (14).

(A7) In the power steering system, a communication pass (14*c*) that connects the inside of the ECU housing (15) and the inside of the motor housing (14) is formed at an upper side in the vertical direction with respect to an axis (A) of the motor housing (14).

(A8) In the power steering system, the motor housing (14) and the ECU housing (15) are connected so that the insides of the motor housing (14) and the ECU housing (15) communicate with each other by an elastic tubular connecting passage (81, 82 and 83).

(A9) In the power steering system, the ECU housing (15) is located at a lower side in the vertical direction with respect to the motor housing (14).

(A10) The power steering system further has a tubular member (95) formed into a tubular shape, one end side of which is connected to any one of the sensor housing (11), the rack housing (12) and the motor housing (14) so as to communicate with the inside of the one of the housings (11; 12; 14), and the respiration valve (9) is provided at the other end side of which. And the respiration valve (9) provided at the other end side of the tubular member (95) is located at an upper side in the vertical direction with respect to the one end side of the tubular member (95) in the vehicle-mounted state.

(A11) In the power steering system, the sensor housing (11) is located at an upper side in the vertical direction with respect to the rack housing (12), the motor housing (14) and the ECU housing (15), and the tubular member (95) is set at the sensor housing (11).

(A12) In the power steering system, the speed reducer (6) is a ball-and-nut mechanism provided at the rack shaft (4) or a second pinion shaft (3*b*) provided so as to be separate from the pinion shaft (3) and engaged with the rack shaft (4), the electric motor (5) provides the steering assist force to the rack shaft (4) through the speed reducer (6), the motor housing (14) and the ECU housing (15) are arranged so as to be separate from the pinion shaft (3), and each inside of the motor housing (14) and the ECU housing (15) communicates with the inside of the sensor housing (11) through the rack shaft (4), the respiration valve (9) is provided at the sensor housing (11), and an opening of the ECU housing (15), which communicates with the inside of the rack housing (12), is located at an upper side in the vertical direction with respect to an axis (0) of the rack housing (12).

(A13) In the power steering system, the respiration valve (9) is provided at the rack housing (12).

(B1) A power steering system mounted in an engine room in a vehicle and providing a steering assist force to steered road wheels, has: a steering shaft (2) to which a turning force from a steering wheel is transmitted; a pinion shaft (3) which is provided at the steering shaft (2); a torque sensor (7) which is provided at the steering shaft (2), has a coil (70) in a sensor housing (11) and detects a steering torque generated at the steering shaft (2); a rack shaft (4) which converts a turning motion of the steering shaft (2) to a shaft direction movement of the steered road wheels by engaging with the pinion shaft (3); a rack housing (12) which houses therein the rack shaft (4) movably in a shaft direction of the rack shaft (4); an electric motor (5) which is provided in a motor housing (14), has a stator and a rotor and provides the steering assist force to the pinion shaft (3) or the rack shaft (4) through a speed reducer (6); a motor control unit (8) which is housed in an ECU housing (15) and has electronic elements that control drive of the electric motor (5) on the basis of the steering torque; a tubular member (95), one end side of which is connected to the ECU housing (15) so as to communicate with an inside of the ECU housing (15), and the other end side of which is located at an upper side with respect to an upper end, in a vertical direction, of the ECU housing (15) in a vehicle-mounted state; and a respiration valve 9 which is provided at the other end side of the tubular member (95) and by which air in the ECU housing (15) can pass through each house and between the inside and an outside of the ECU housing (15) in a bidirectional direction so as to absorb change of expansion/contraction of the air in the ECU housing (15) while suppressing entry of water into the inside of the ECU housing (15) from the outside.

(B2) In the power steering system, the motor housing (14) and the ECU housing (15) are separately provided, and insides of the motor housing (14) and the ECU housing (15) communicate with each other by an elastic electric signal line (81, 82 and 83).

(B3) In the power steering system, the ECU housing (15) is located at an upper side in the vertical direction with respect to the motor housing (14).

(B4) In the power steering system, the tubular member (95) is provided so as to cover a power cable at an ECU housing (15) side which is a part, in an axial direction, of the whole power cable that supplies power from a vehicle-mounted battery (BATT) to the ECU housing (15).

(C1) A power steering system mounted in an engine room in a vehicle and providing a steering assist force to steered road wheels, has: a steering shaft (2) to which a turning force from a steering wheel is transmitted; a pinion shaft (3) which is provided at the steering shaft (2); a torque sensor (7) which is provided at the steering shaft (2), has a coil (70) in a sensor housing (11) and detects a steering torque generated at the steering shaft (2); a rack housing (12) whose inside space communicates with an inside space of the sensor housing (11); a rack shaft (4) which is provided movably in a shaft direction thereof in the rack housing (12) and converts a turning motion of the steering shaft (2) to a shaft direction movement of the steered road wheels by engaging with the pinion shaft (3); a motor housing (14) whose inside space communicates with the inside space of the rack housing (12); an electric motor (5) which is provided in the motor housing (14), has a stator and a rotor and provides the steering assist force to the pinion shaft (3) or the rack shaft (4) through a speed reducer (6); an ECU housing (15) whose inside space communicates with the inside space of the motor housing (14); a motor control unit (8) which is housed in the ECU housing (15) and has electronic elements that control drive of the electric motor (5) on the basis of the steering torque; and a seal member (102) which is provided between a housing unit (10), which is formed by the sensor housing (11), the rack housing (12), the motor housing (14) and the ECU housing (15) so that insides of the sensor housing (11), the rack housing (12), the motor housing (14) and the ECU housing (15) communicate with each other, and a partition wall (100) by which the vehicle engine room and a vehicle interior are partitioned and also an inside of the housing unit (10) and the vehicle interior communicate with each other. The seal member (102) suppresses entry of water from an outside into the inside of the housing unit (10).

(C2) In the power steering system, the seal member is a cylindrical boot (102) that is provided between the sensor housing (11) and the partition wall (100) so as to enclose the steering shaft (2).

(C3) In the power steering system, the seal member is a hose (95) that is formed into a tubular shape by an elastic material and connects the housing unit (10) and the partition wall (100).

The entire contents of Japanese Patent Application No. 2012-004569 filed on Jan. 13, 2012 are incorporated herein by reference.

Although the invention has been described above by reference to certain embodiments of the invention, the invention is not limited to the embodiments described above. Modifications and variations of the embodiments described above will occur to those skilled in the art in light of the above teachings. The scope of the invention is defined with reference to the following claims.

What is claimed is:

1. A power steering system mounted in an engine room in a vehicle and providing a steering assist force to steered road wheels, comprising:
    a steering shaft to which a turning force from a steering wheel is transmitted;
    a pinion shaft which is provided at the steering shaft and housed in a pinion shaft housing portion, the pinion shaft supported by a pair of bearings in the pinion shaft housing portion;
    a torque sensor which is provided at the steering shaft, has a coil in a sensor housing, and detects a steering torque generated at the steering shaft;
    a rack housing whose inside space communicates with an inside space of the sensor housing the rack housing forming a gear housing part along with the pinion shaft housing portion;
    a rack shaft which is provided movably in a shaft direction thereof in the rack housing and converts a turning motion of the steering shaft to a shaft direction movement of the steered road wheels by engaging with the pinion shaft;
    a motor housing whose inside space communicates with the inside space of the rack housing;
    an electric motor which is provided in the motor housing, has a stator and a rotor and provides the steering assist force to the pinion shaft or the rack shaft through a speed reducer;
    an ECU housing which is formed integrally with the motor housing and whose inside space communicates with the inside space of the motor housing, an inside space of the pinion shaft housing portion communicating with the sensor housing, the rack housing, the motor housing, and the ECU housing;
    a motor control unit which is housed in the ECU housing and has electronic elements that control drive of the electric motor on the basis of the steering torque; and
    a respiration valve which is provided at any of the sensor housing, the rack housing, and the motor housing and is located at an upper side with respect to an upper end, in a vertical direction, of the ECU housing so as to open to space located at an upper side with respect to the bearing that is the bearing positioned at an upper side, in the vertical direction, of the pair of bearings in a state in which the power steering system is mounted in a vehicle body, the respiration valve having a function by which air can pass through the housing at which it is provided and between an inside and an outside of the ECU housing in a bidirectional direction so as to absorb change of expansion/contraction of the air in the ECU housing while suppressing entry of water from the outside.

2. The power steering system as claimed in claim 1, wherein:
    the sensor housing is located at an upper side in the vertical direction with respect to the rack housing, the motor housing and the ECU housing,
    the respiration valve is provided at the sensor housing,
    the sensor housing is formed by resin material by molding, and
    the respiration valve is formed integrally with the sensor housing by the molding.

3. The power steering system as claimed in claim 1, wherein:
    the speed reducer is a ball-and-nut mechanism provided at the rack shaft or a second pinion shaft provided so as to be separate from the pinion shaft and engaged with the rack shaft,
    the electric motor provides the steering assist force to the rack shaft through the speed reducer,
    the motor housing and the ECU housing are arranged so as to be separate from the pinion shaft, and each inside of the motor housing and the ECU housing communicates with the inside of the sensor housing through the rack shaft,
    the respiration valve is provided at the sensor housing, and
    an opening of the ECU housing, which communicates with the inside of the rack housing, is located at an upper side in the vertical direction with respect to an axis of the rack housing.

4. The power steering system as claimed in claim 2, wherein:
the ECU housing is located at an upper side in the vertical direction with respect to the motor housing.

5. The power steering system as claimed in claim 2, wherein:
a communication pass that connects the inside of the ECU housing and the inside of the motor housing is formed at an upper side in the vertical direction with respect to an axis of the motor housing.

6. The power steering system as claimed in claim 2, wherein:
the motor housing and the ECU housing are connected so that the insides of the motor housing and the ECU housing communicate with each other by an elastic tubular connecting passage.

7. The power steering system as claimed in claim 6, wherein:
the ECU housing is located at a lower side in the vertical direction with respect to the motor housing.

8. The power steering system as claimed in claim 1, further comprising:
a tubular member formed into a tubular shape, one end side of which is connected to any one of the sensor housing, the rack housing and the motor housing so as to communicate with the inside of the one of the housings, and the respiration valve is provided at the other end side of which, and wherein
the respiration valve provided at the other end side of the tubular member is located at an upper side in the vertical direction with respect to the one end side of the tubular member in the vehicle-mounted state.

9. The power steering system as claimed in claim 8, wherein:
the sensor housing is located at an upper side in the vertical direction with respect to the rack housing, the motor housing and the ECU housing, and
the tubular member is set at the sensor housing.

* * * * *